US012719806B2

(12) United States Patent
Lee et al.

(10) Patent No.: US 12,719,806 B2
(45) Date of Patent: Aug. 25, 2026

(54) METHOD FOR TRANSMITTING AND RECEIVING DATA IN SHORT-RANGE WIRELESS COMMUNICATION SYSTEM AND DEVICE THEREFOR

(71) Applicant: LG ELECTRONICS INC., Seoul (KR)

(72) Inventors: Hyeonjae Lee, Seoul (KR); Minsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 342 days.

(21) Appl. No.: 18/560,333

(22) PCT Filed: May 10, 2022

(86) PCT No.: PCT/KR2022/006696
§ 371 (c)(1),
(2) Date: Jul. 8, 2024

(87) PCT Pub. No.: WO2022/240160
PCT Pub. Date: Nov. 17, 2022

(65) Prior Publication Data

US 2024/0396849 A1 Nov. 28, 2024

(30) Foreign Application Priority Data

May 10, 2021 (KR) ........................ 10-2021-0060192

(51) Int. Cl.
*H04L 47/28* (2022.01)
*H04L 12/403* (2006.01)

(52) U.S. Cl.
CPC ............ *H04L 47/28* (2013.01); *H04L 12/403* (2013.01)

(58) Field of Classification Search
CPC ........ H04L 47/28; H04L 12/403; H04W 4/80; H04W 84/12
(Continued)

(56) References Cited

U.S. PATENT DOCUMENTS 11,064,281 B1 * 7/2021 Batta .................... H04R 1/1041
11,182,794 B1 * 11/2021 Aument ................ G07F 7/0886
(Continued)

FOREIGN PATENT DOCUMENTS

WO 2017146829 8/2017
WO 2020213959 10/2020

OTHER PUBLICATIONS

Martin Woolley, "Bluetooth Core Specification Version 5.2 Feature Overview", Apr. 2021, Bluetooth.com, version 1.0.1, https://web.archive.org/web/20210414112742/https://www.bluetooth.com/wp-content/uploads/2020/01/Bluetooth_5.2 Feature_Overview.pdf (Year: 2021).*

(Continued)

*Primary Examiner* — Ruolei Zong
(74) *Attorney, Agent, or Firm* — LEE, HONG, DEGERMAN, KANG & WAIMEY

(57) ABSTRACT

A method of transmitting and receiving data in a short-range wireless communication system and a device therefor are provided. More specifically, a method of transmitting and receiving, by a master device, data in a short-range wireless communication system comprises forming a Connected Isochronous channel Stream (CIS) channel or a Broadcast Isochronous channel Stream (BIS) channel with at least one first slave device; forming the CIS channel with at least one second slave device; and transmitting and receiving data to and from the at least one first slave device and the at least one second slave device based on at least one time interval that is periodically allocated. Each of the at least one time
(Continued)

interval includes at least one sub-time interval, and the at least one sub-time interval includes (i) a first time interval in which the master device transmits data to the at least one first slave device and/or the at least one second slave device and (ii) a second time interval in which the master device receives data generated based on a user input from the at least one first slave device and/or the at least one second slave device.

15 Claims, 33 Drawing Sheets

(58) Field of Classification Search
USPC .......................................................... 709/224
See application file for complete search history.

(56) References Cited

U.S. PATENT DOCUMENTS 11,257,072 B1 * 2/2022 Aument .................. G07F 7/088
2017/0034646 A1 * 2/2017 Song ..................... H04W 8/005
2017/0251469 A1 * 8/2017 Lee ................... H04W 72/0446
2017/0303076 A1 * 10/2017 Song ........................ H04W 4/80
2021/0014081 A1 * 1/2021 Guo .................. H04L 12/40123
2021/0037582 A1 * 2/2021 Kim ...................... H04W 12/55
2022/0141106 A1 * 5/2022 Pera ...................... G06F 9/4416
709/224
2022/0225452 A1 * 7/2022 Jang ...................... H04W 88/02
2022/0391164 A1 * 12/2022 Bonde ................... H04W 12/50
2022/0394794 A1 * 12/2022 Zhang ................. H04W 28/021

OTHER PUBLICATIONS

PCT International Application No. PCT/KR2022/006696, International Search Report dated Aug. 24, 2022, 3 pages.
Woolley, “Bluetooth Core Specification Version 5.2 Feature Overview,” Bluetooth, Version 1.0.1, Dec. 2020, 37 pages.
Wang et al., “Bluetooth 5.2 Technology and Application, ”International Journal of Advanced Network, Monitoring and Controls, vol. 06 No. 02, Jan. 2021, 6 pages.

* cited by examiner

【FIG. 1】
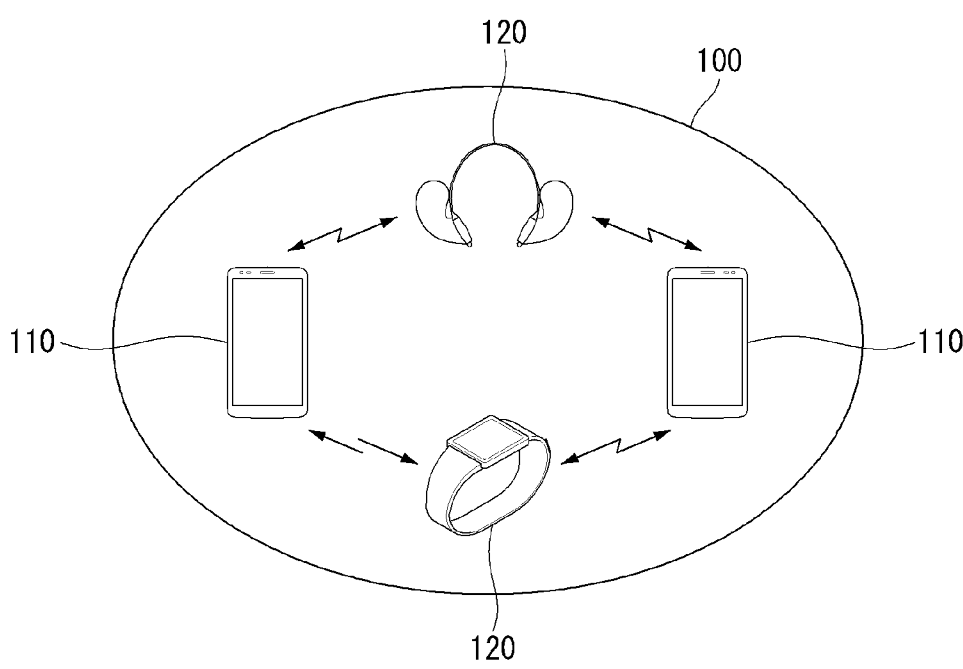

【FIG. 2】
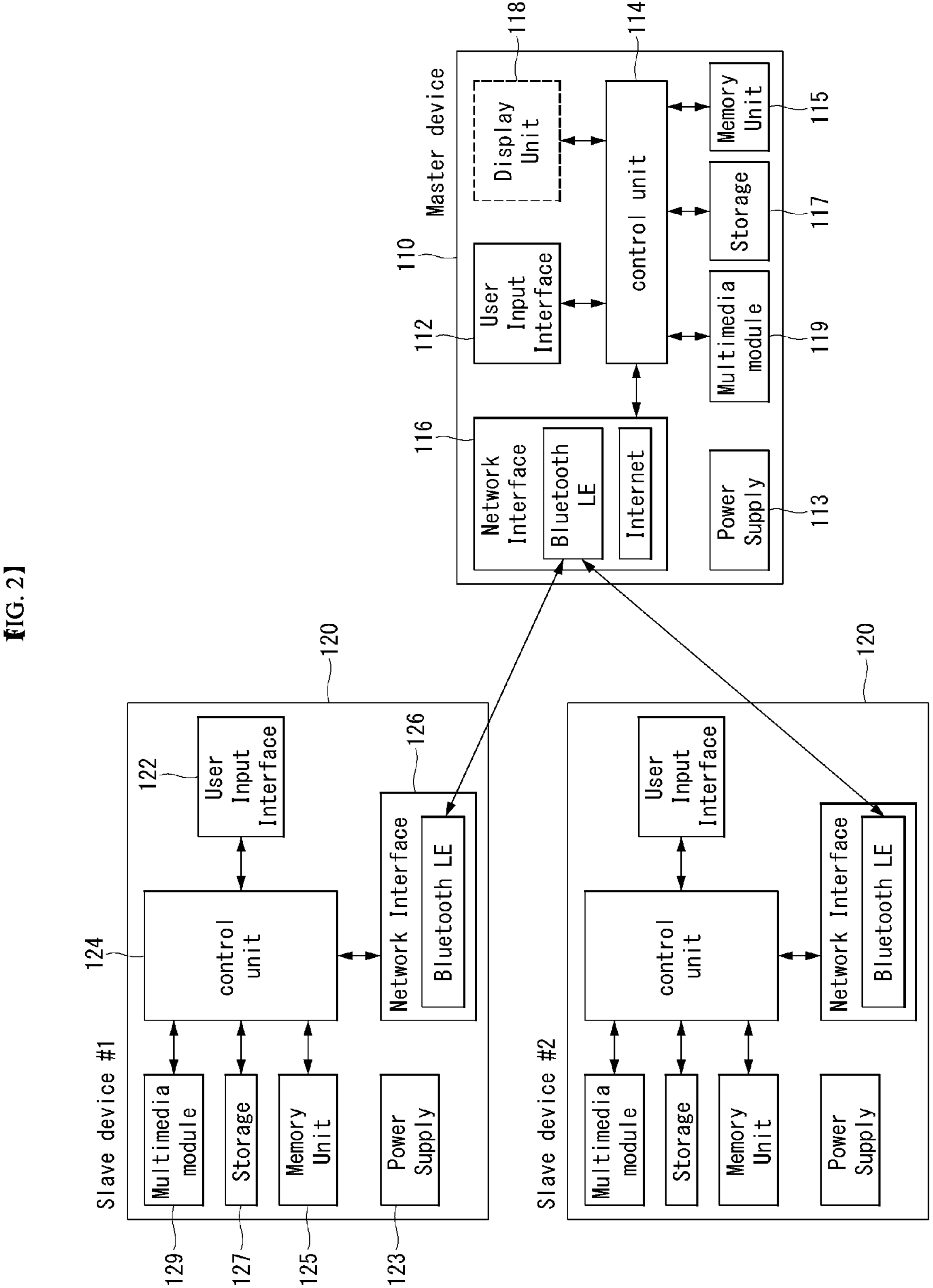

【FIG. 3】
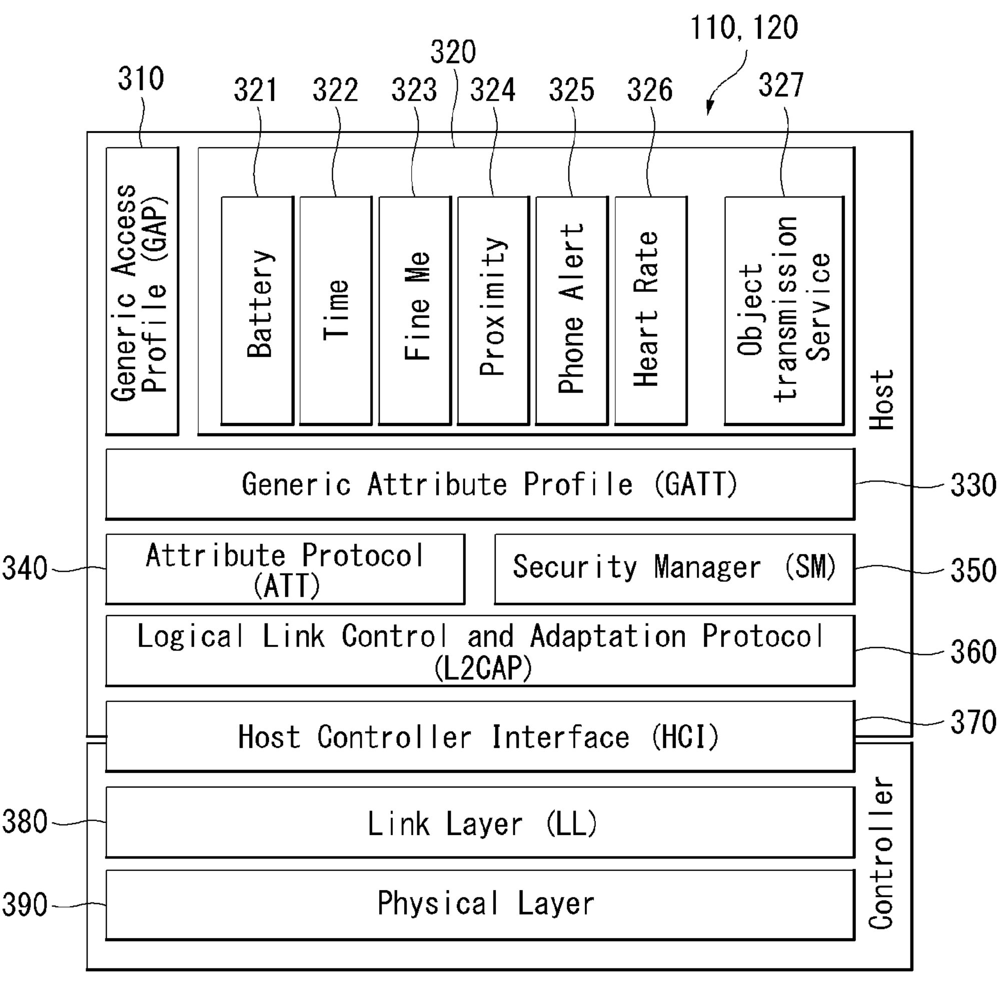

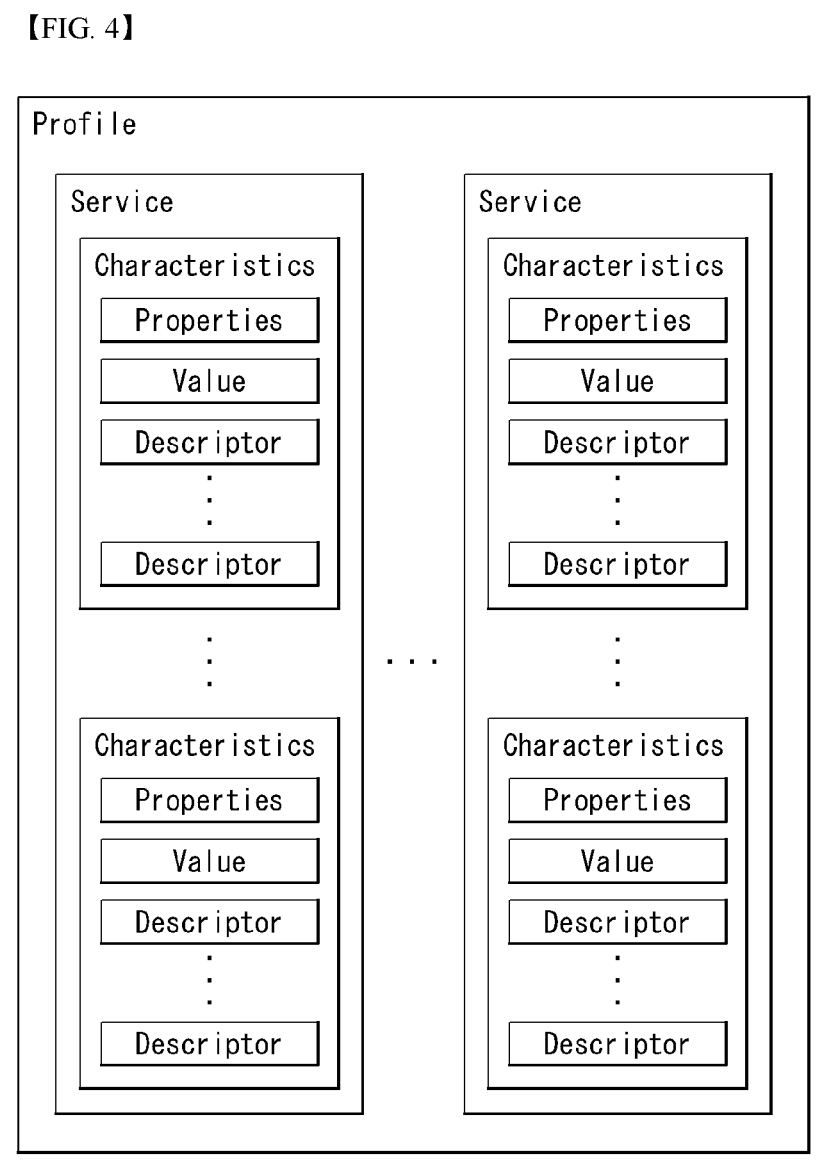

【FIG. 4】

Profile

Service

Characteristics

Properties

Value

Descriptor

Descriptor

Characteristics

Properties

Value

Descriptor

Descriptor

Service

Characteristics

Properties

Value

Descriptor

Descriptor

Characteristics

Properties

Value

Descriptor

Descriptor

【FIG. 5】
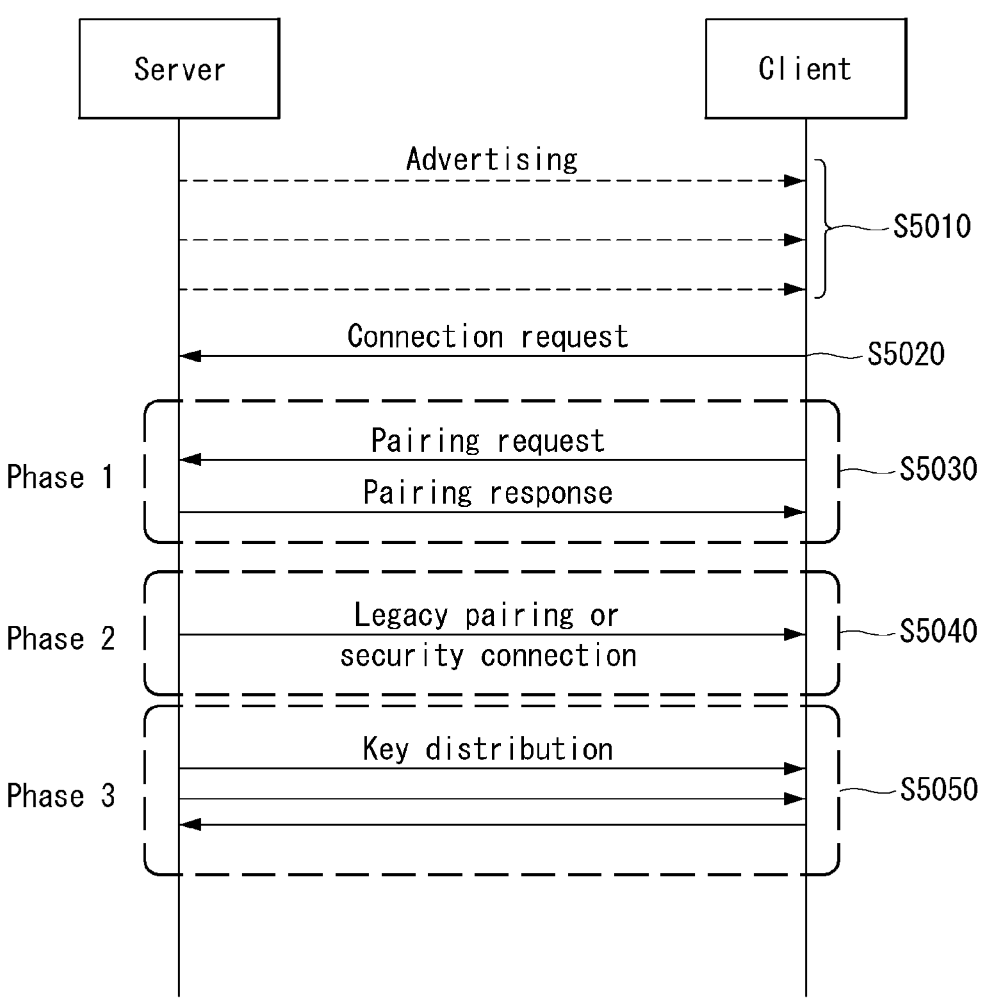

【FIG. 6】
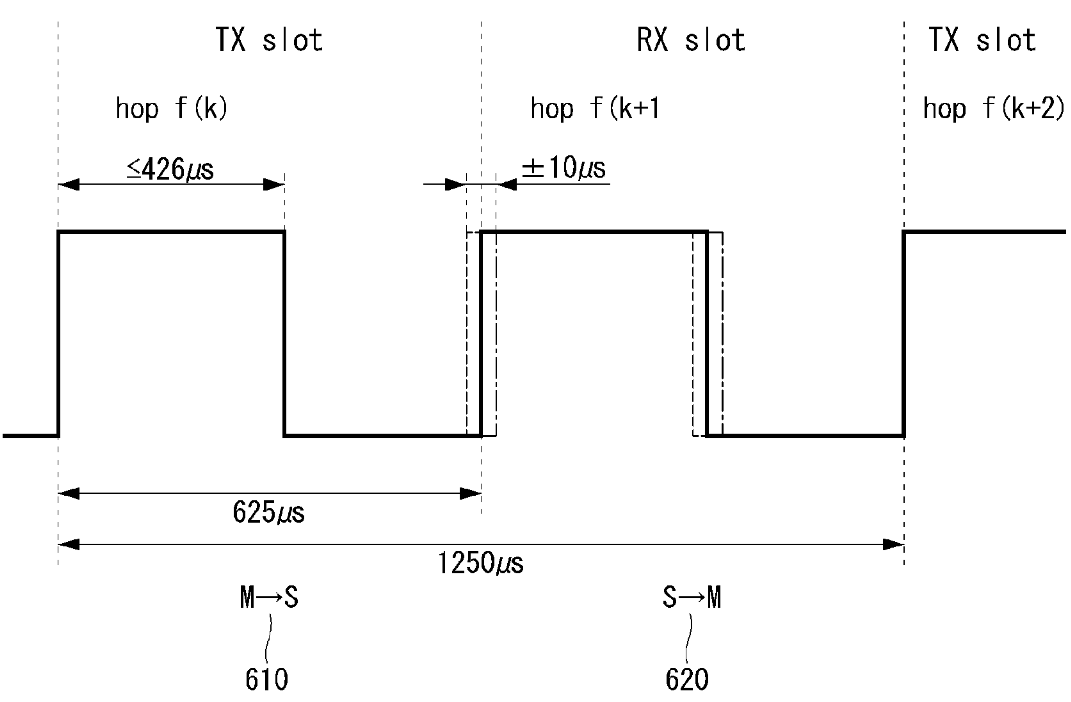
【FIG. 7】
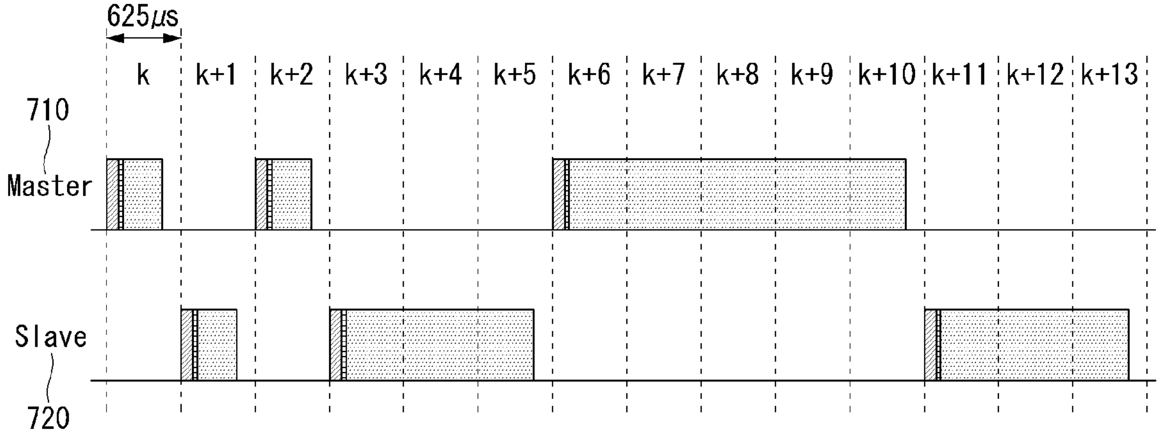

【FIG. 8】
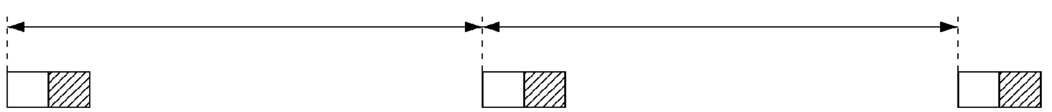
3bit : address
【FIG. 9】
【FIG. 10】
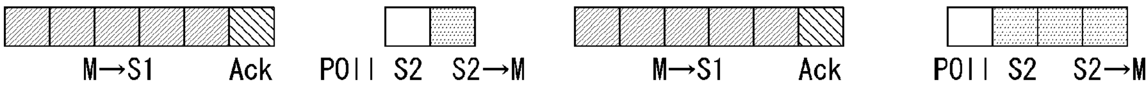
【FIG. 11】
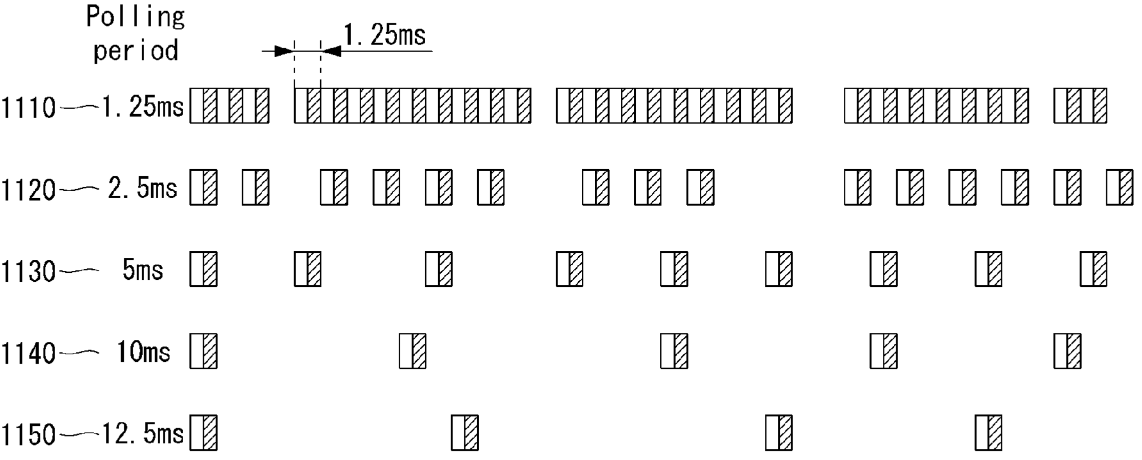

【FIG. 12】
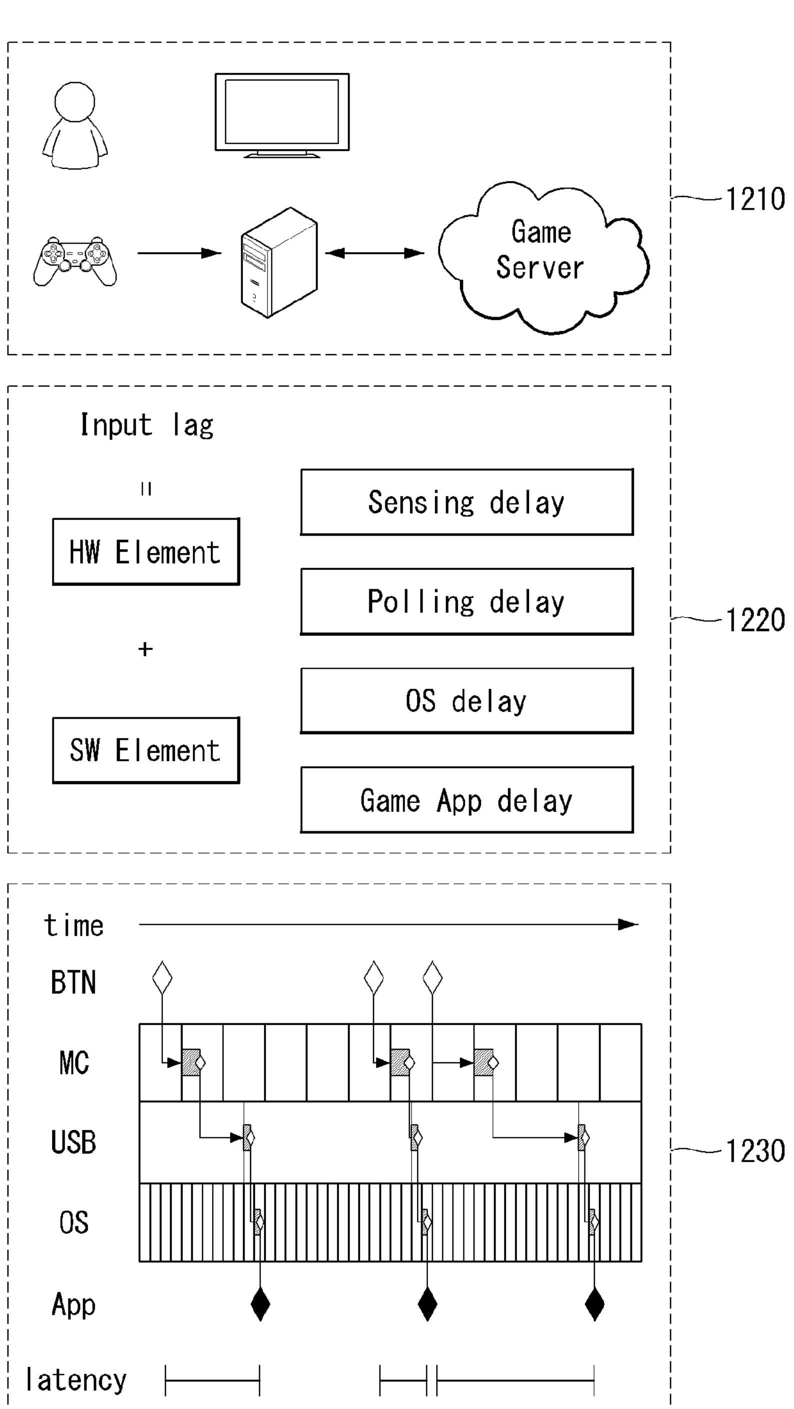

【FIG. 13】
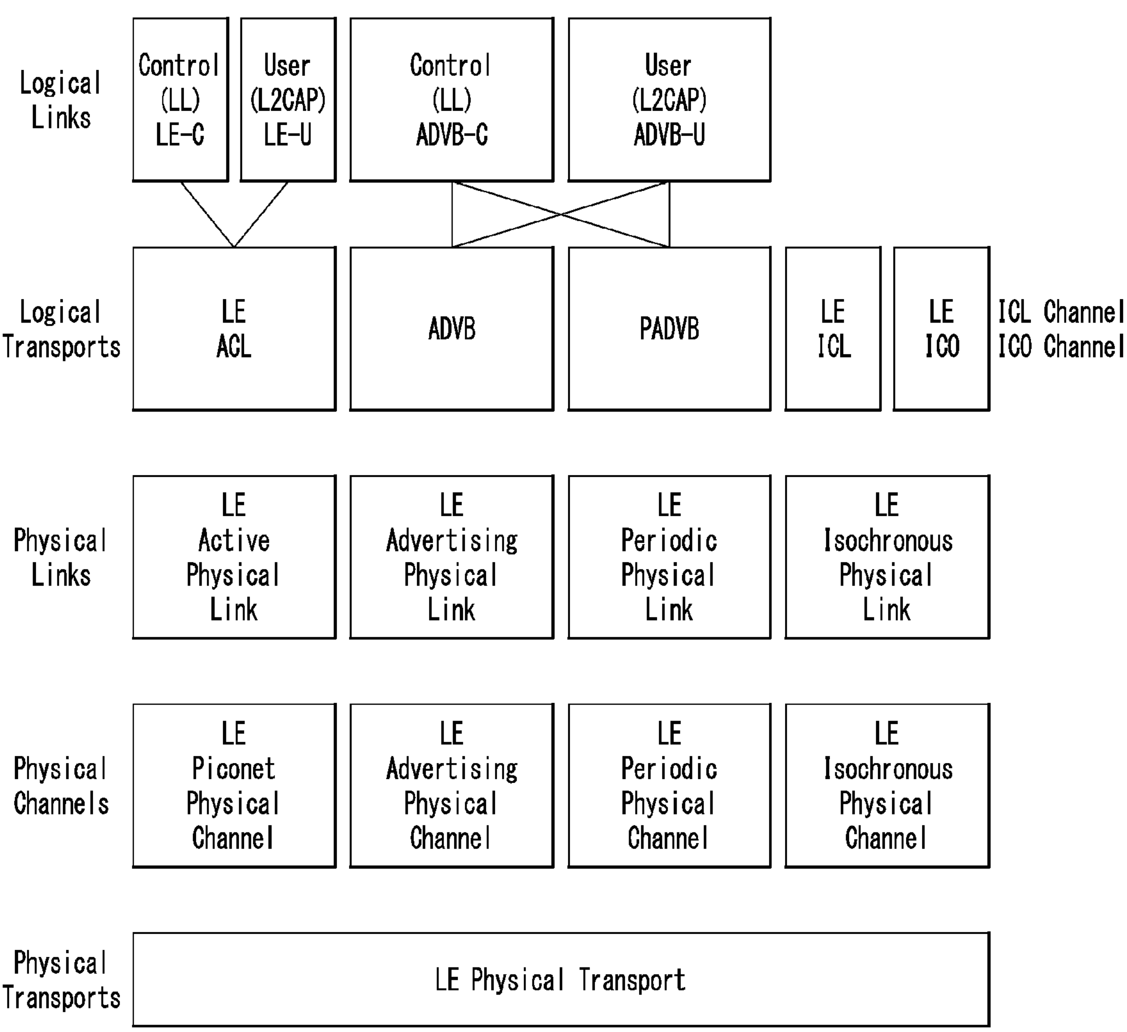

【FIG. 14】
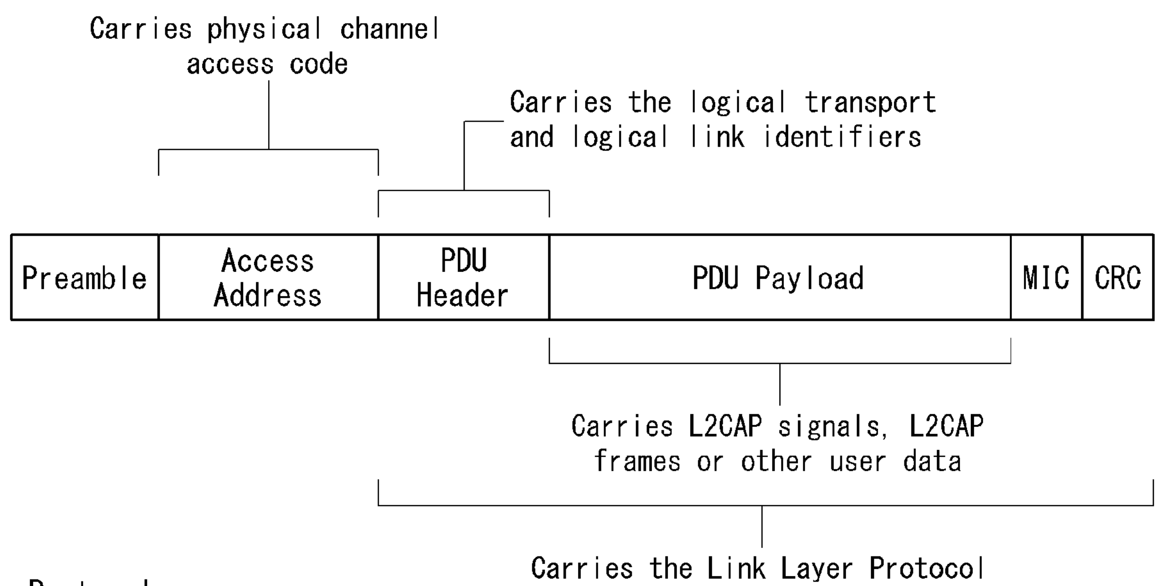

【FIG. 15】
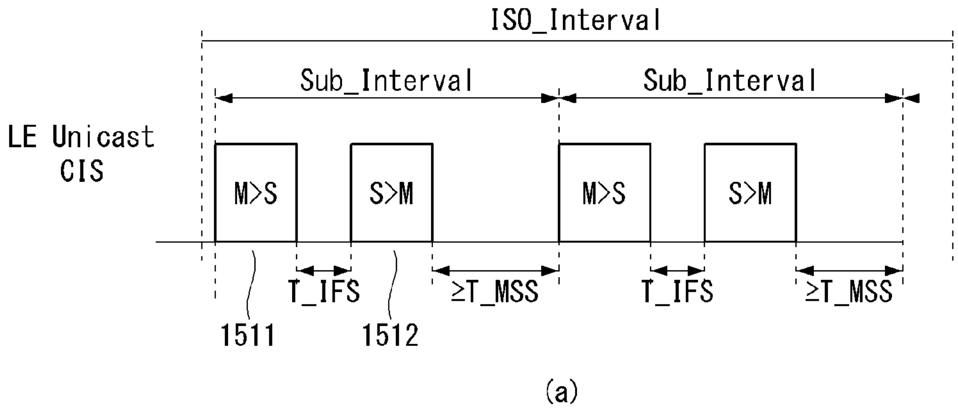
(a)
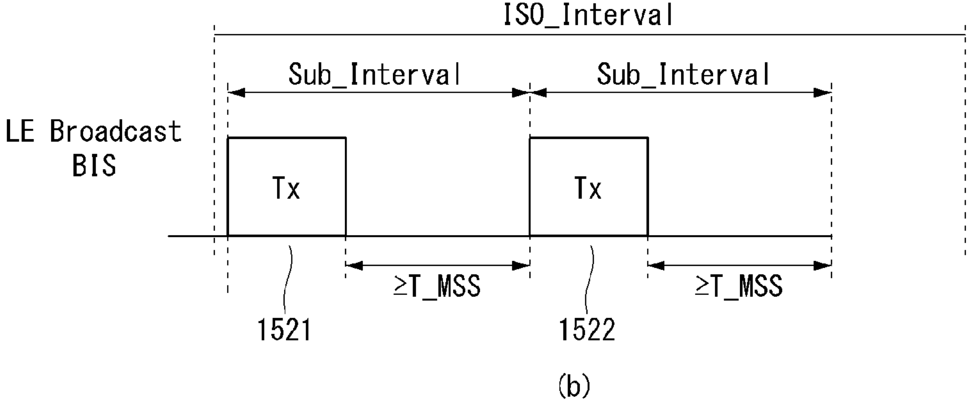
(b)

【FIG. 16】
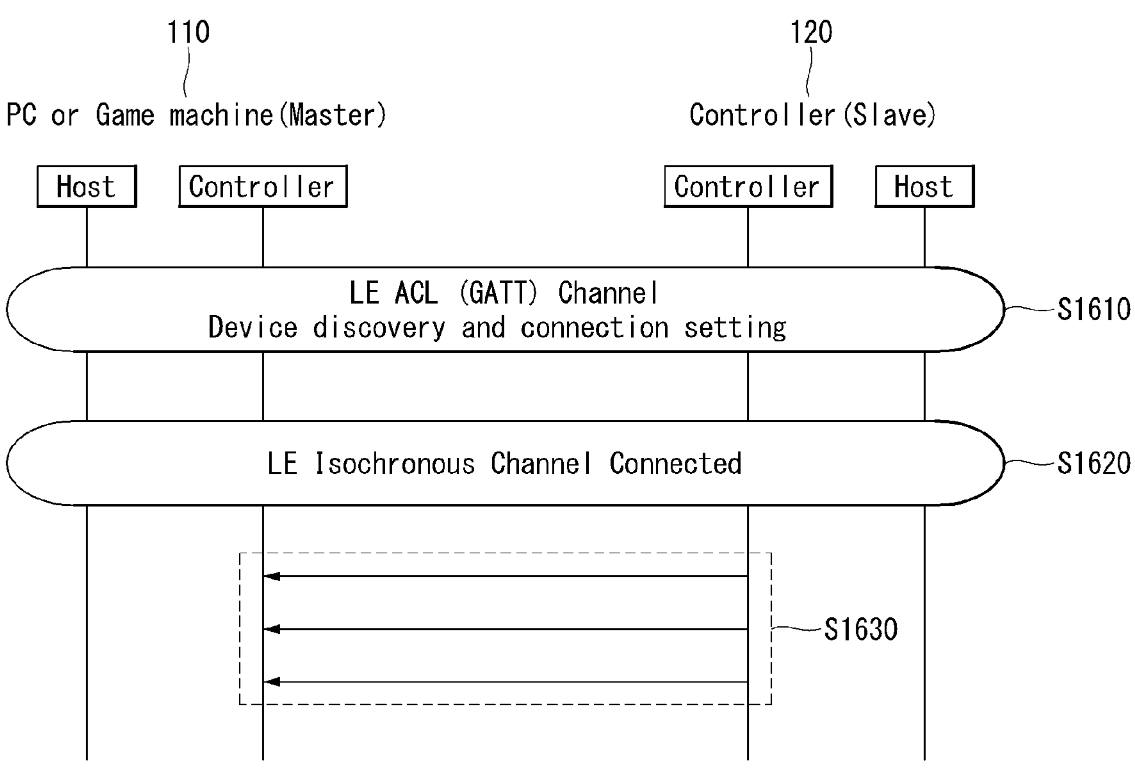
【FIG. 17】
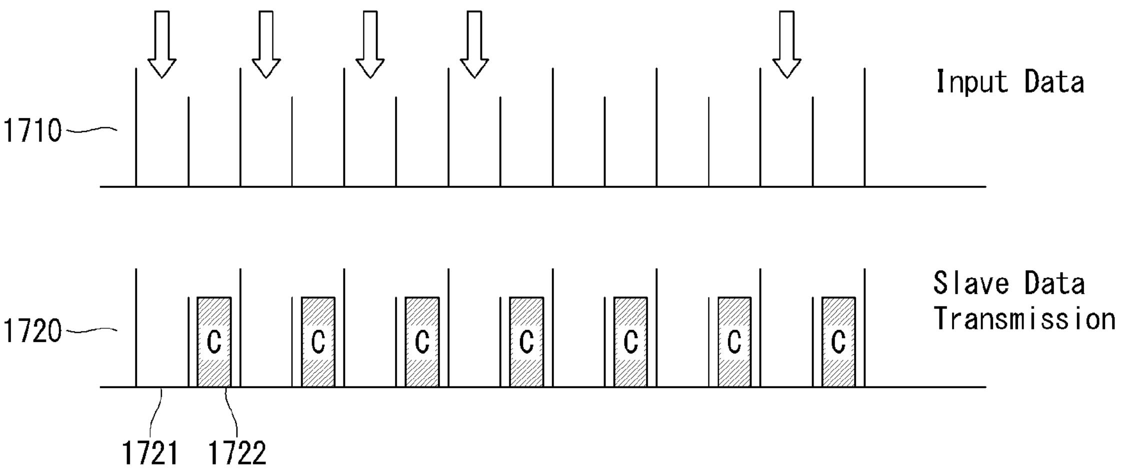

【FIG. 18】
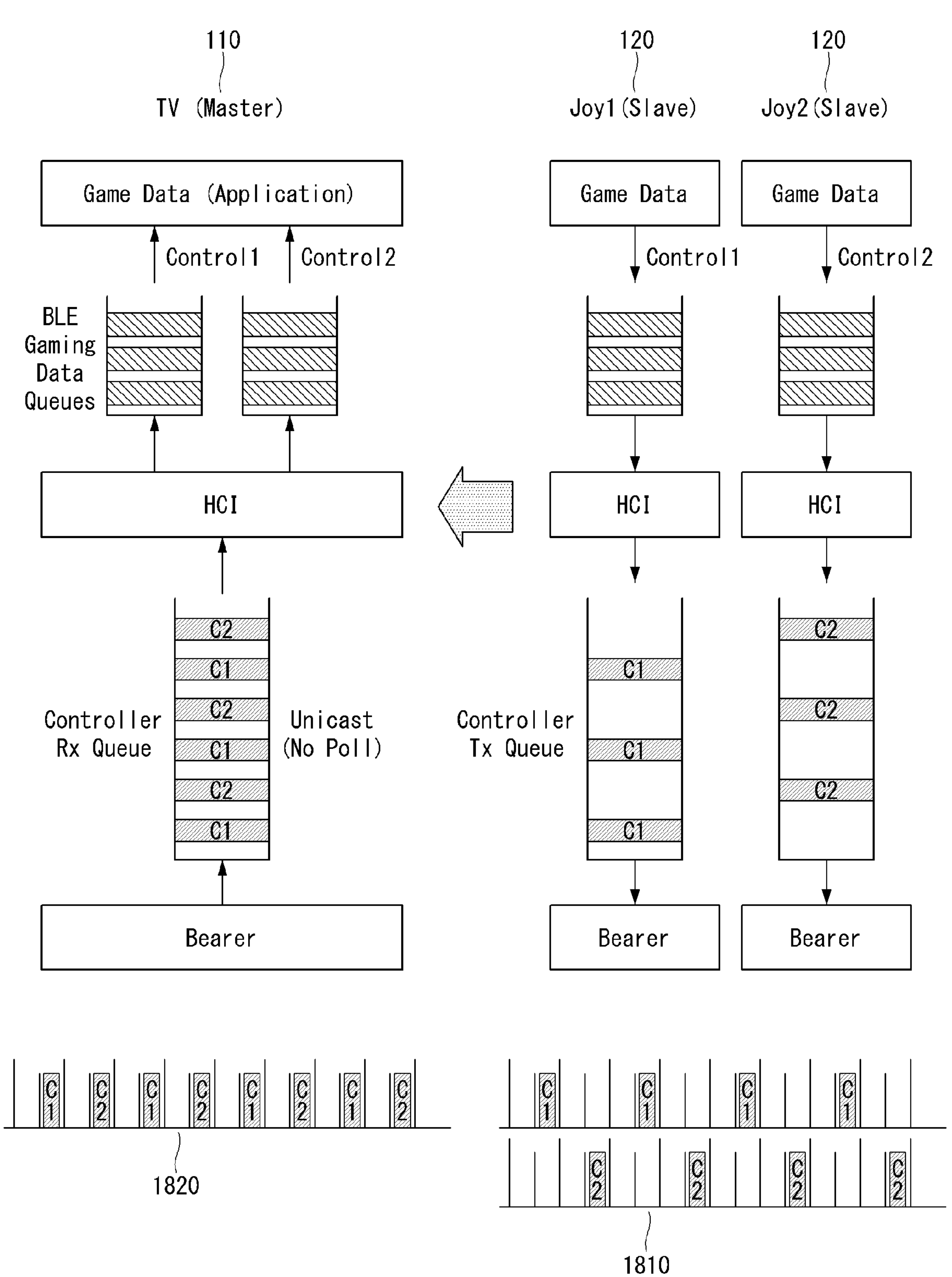

【FIG. 19】
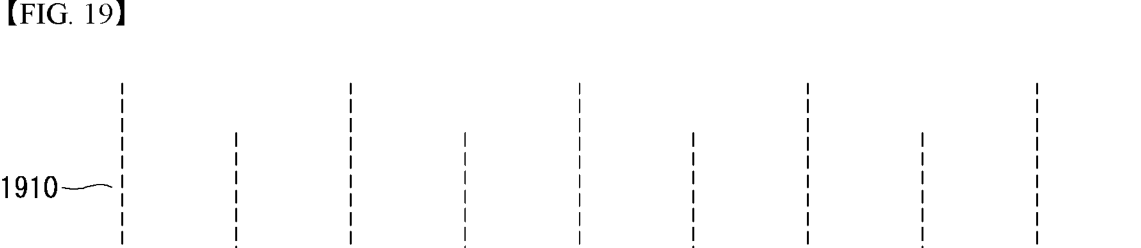
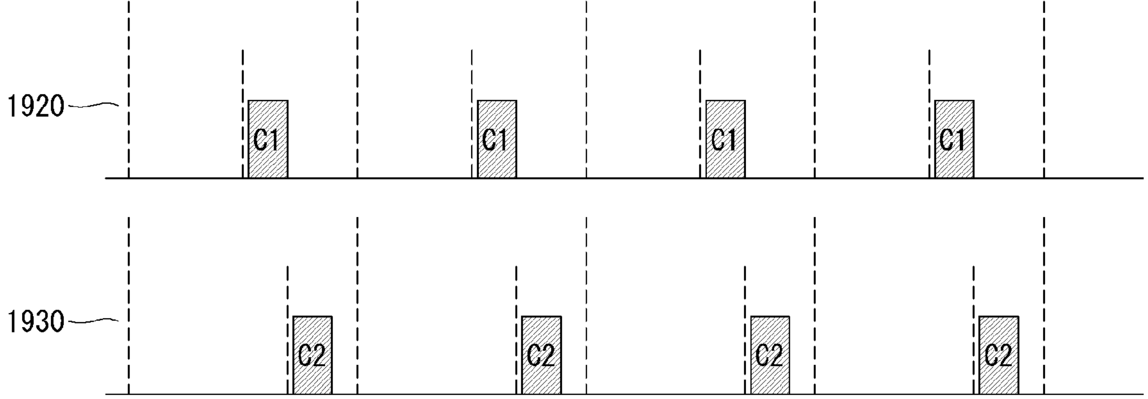

【FIG. 20】
(a)
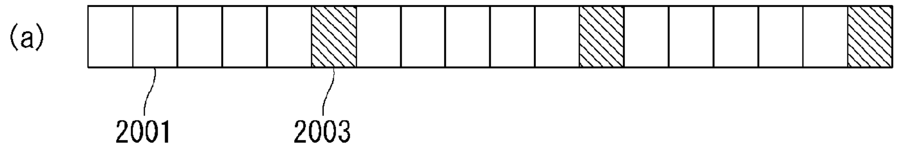
(b)
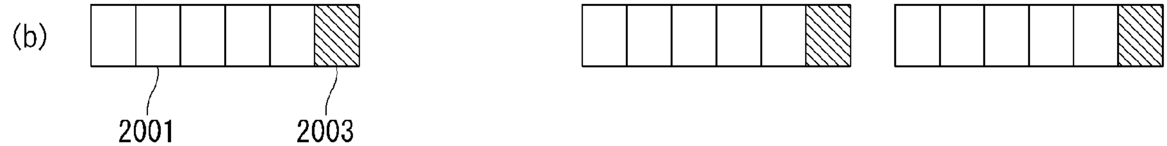
(c)
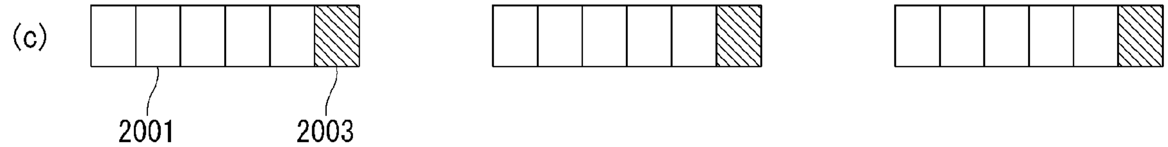

【FIG. 21】
(a)
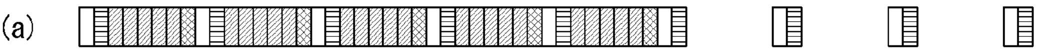
5ms
(b)
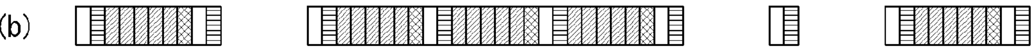
(c)
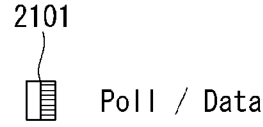

【FIG. 22】
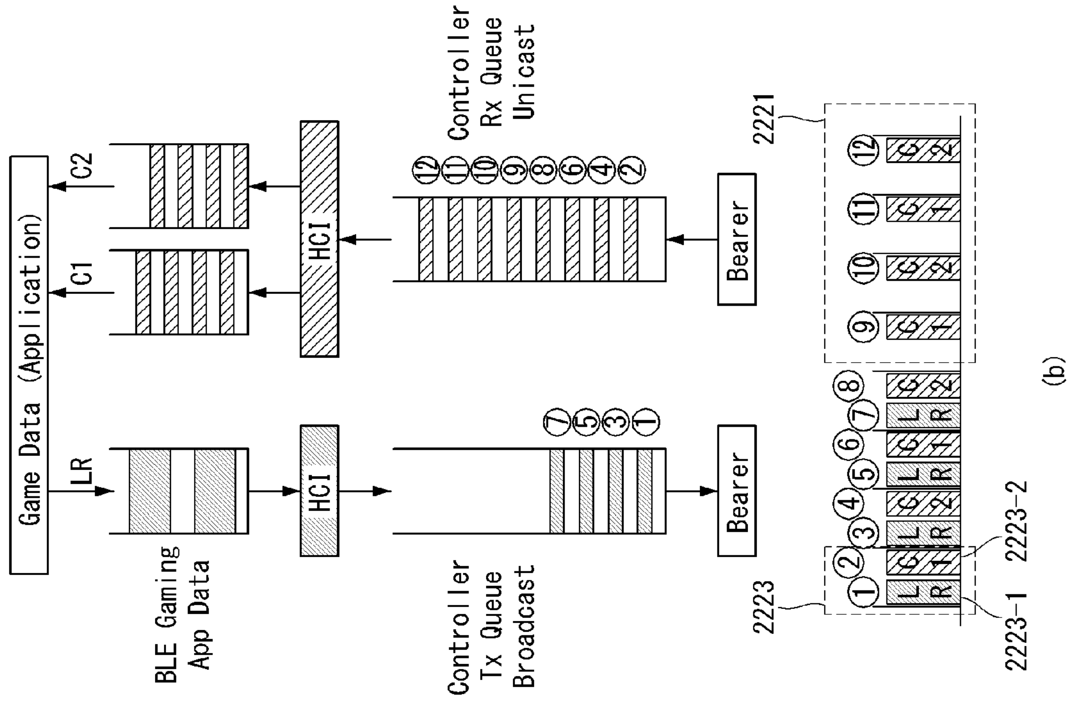
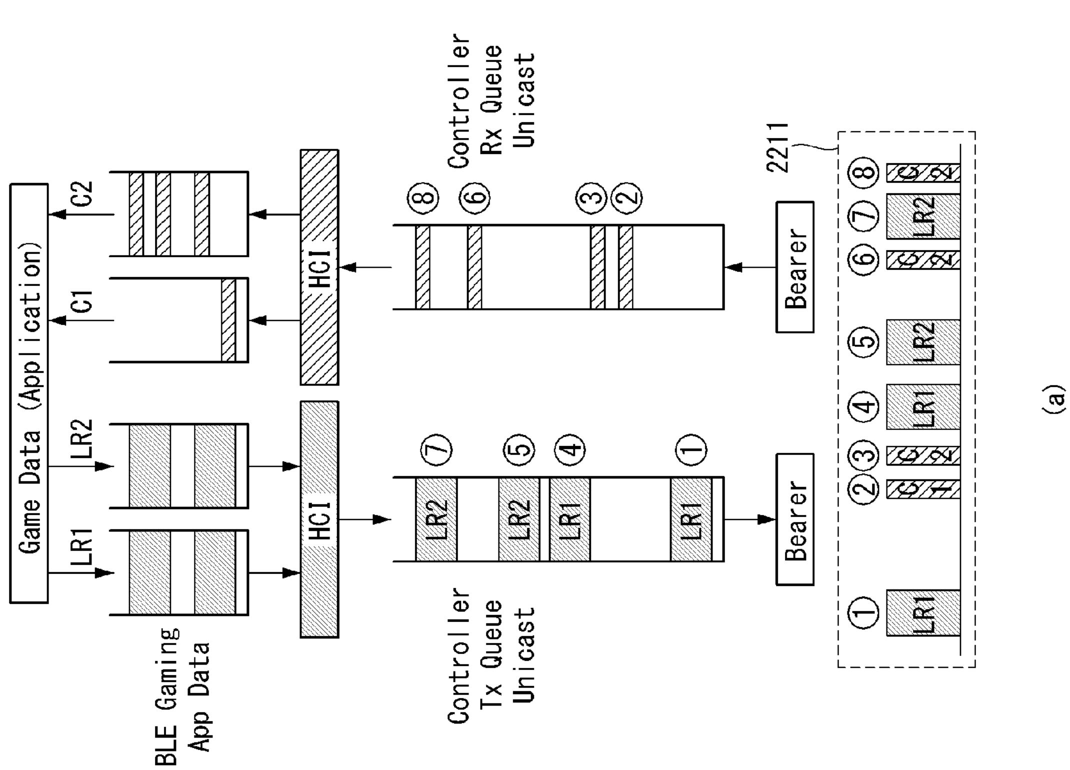

【FIG. 23】
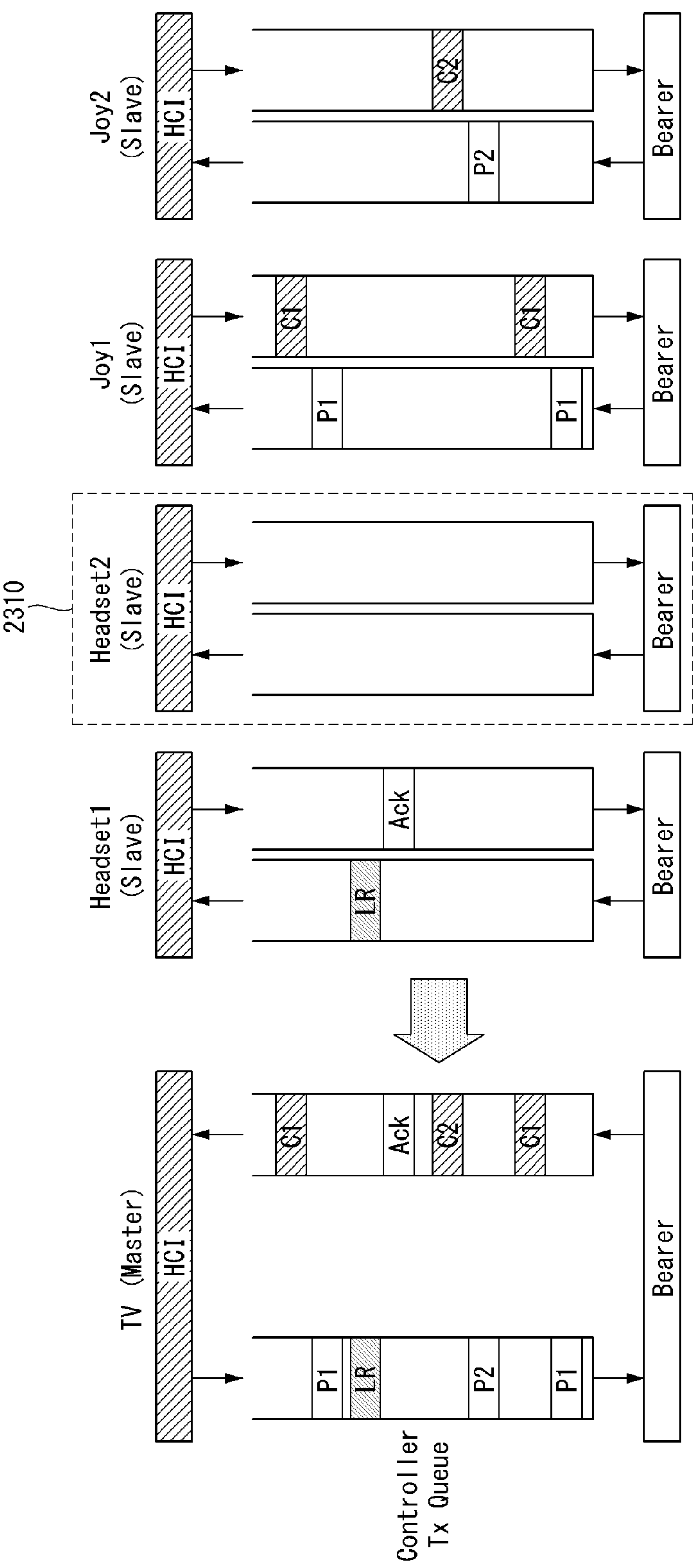

2410
Headset1, 2
(Slave)
Game Data
HCI
Bearer
Joy1
(Slave)
Game Data
HCI
C1
C1
C1
Bearer
Joy2
(Slave)
Game Data
HCI
C2
C2
C2
Bearer
TV (Master)
Game Data (Application)
LR stereo
C1
C2
BLE Gaming
Data Queues
HCI
HCI
2420
Broadcast
2430
Unicast
(No Poll)
C2
C1
C2
C1
C2
C1
Bearer

【FIG. 36】
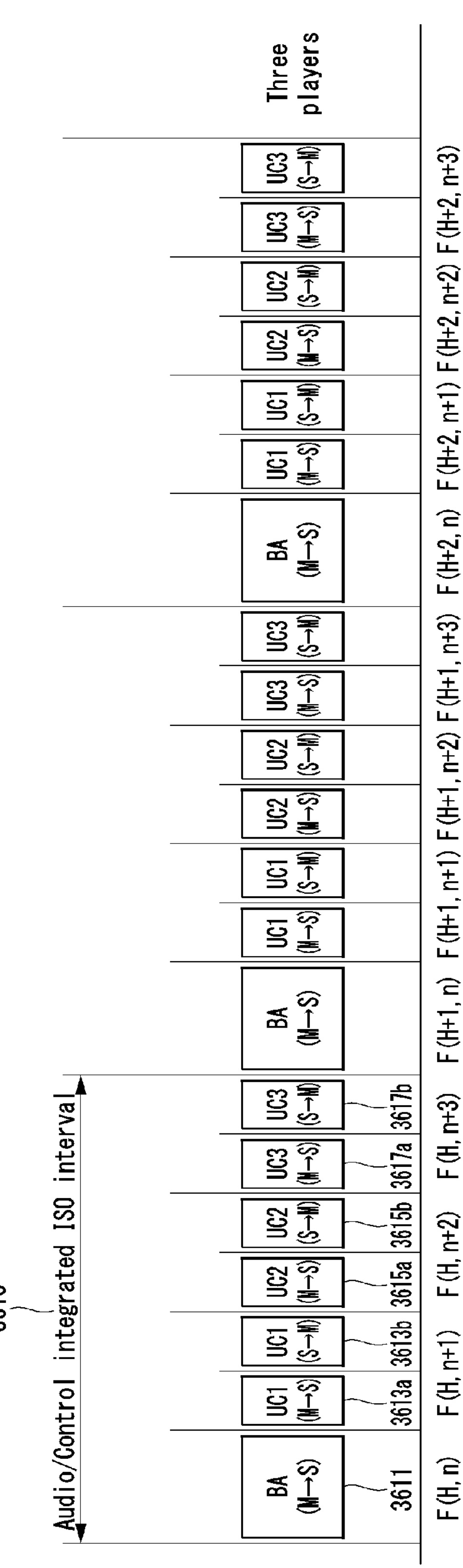

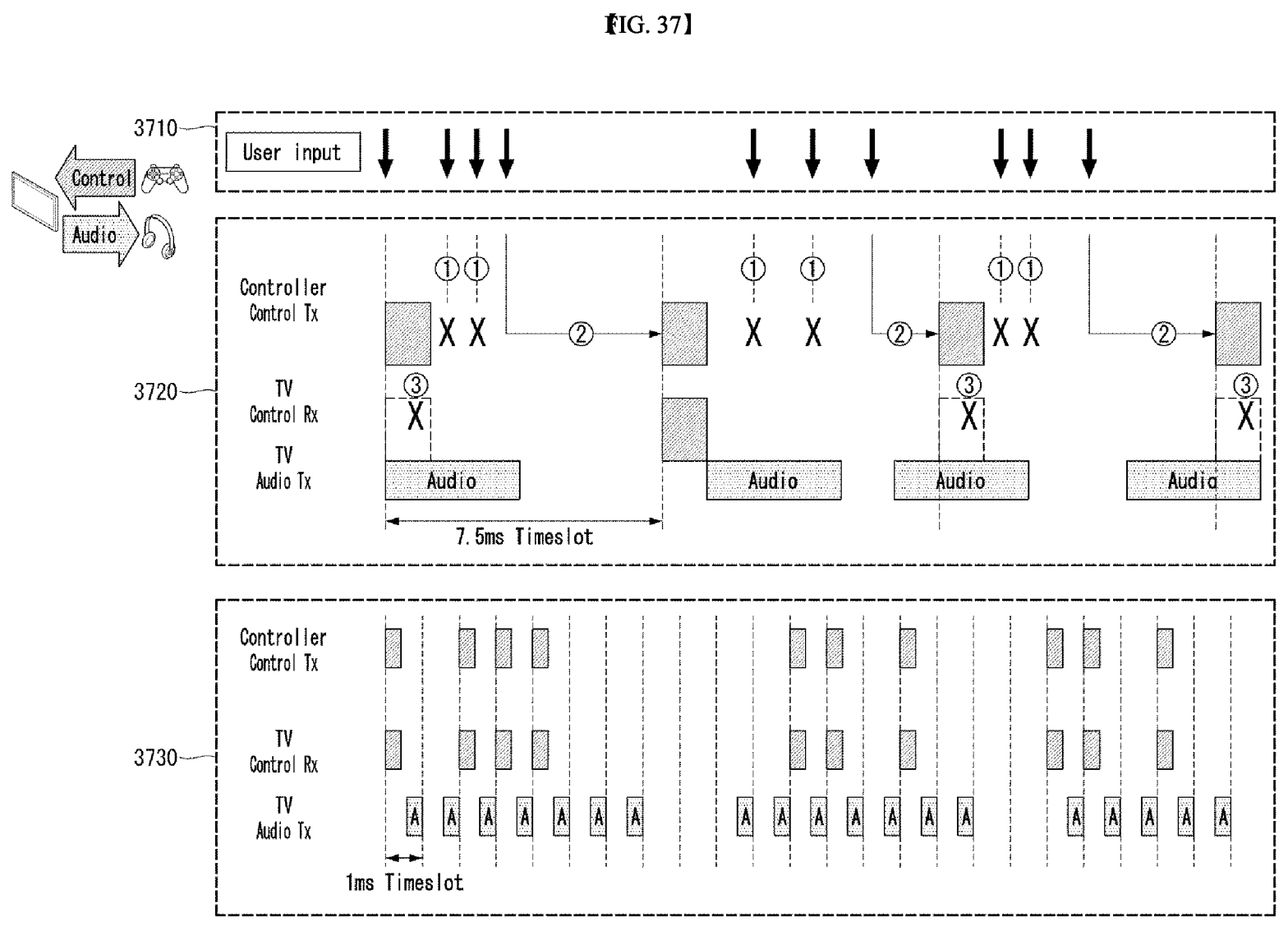

【FIG. 37】

【FIG. 38】
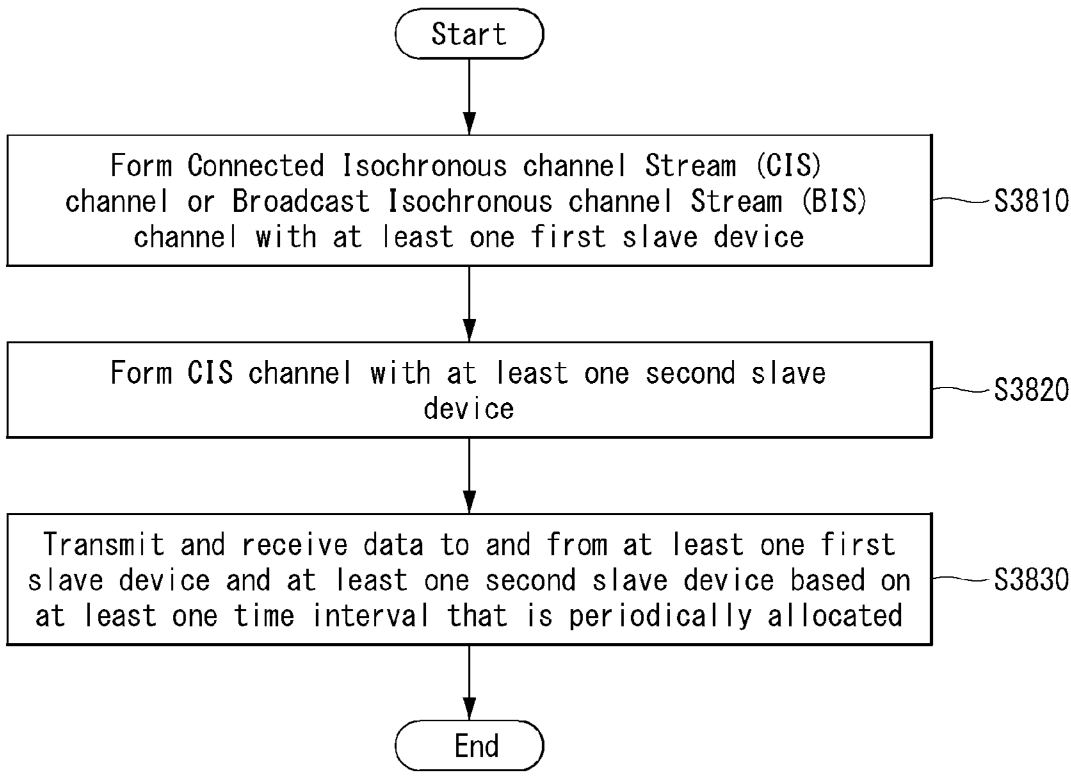

METHOD FOR TRANSMITTING AND RECEIVING DATA IN SHORT-RANGE WIRELESS COMMUNICATION SYSTEM AND DEVICE THEREFOR

CROSS-REFERENCE TO RELATED APPLICATION(S)

This application is the National Stage filing under 35 U.S.C. 371 of International Application No. PCT/KR2022/006696, filed on May 10, 2022, which claims the benefit of earlier filing date and right of priority to Korean Application No. 10-2021-0060192, filed on May 10, 2021, the contents of which are all incorporated by reference herein in their entirety.

TECHNICAL FIELD

The present disclosure relates to a method of transmitting and receiving data using a short-range communication technology in a wireless communication system and a device therefor, and more particularly to a method of transmitting and receiving data using Bluetooth technology and a device therefor.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

An object of the present disclosure is to provide a method of transmitting and receiving data in a short-range wireless communication system and a device therefor.

Another object of the present disclosure is to provide a method for a plurality of slave devices to transmit isochronous data to a master device with a low delay and a device therefor.

Another object of the present disclosure is to provide a method for a master device to transmit audio data to slave devices at regular data packet intervals and a device therefor.

Another object of the present disclosure is to provide a method of performing both data transmission of a master device to a slave device and data transmission of a slave device to a master device within one time interval and a device therefor.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

The present disclosure provides a method of transmitting and receiving data in a short-range wireless communication system and a device therefor.

More specifically, in one aspect of the present disclosure, there is provided a method of transmitting and receiving, by a master device, data in a short-range wireless communication system, the method comprising forming a Connected Isochronous channel Stream (CIS) channel or a Broadcast Isochronous channel Stream (BIS) channel with at least one first slave device; forming the CIS channel with at least one second slave device; and transmitting and receiving data to and from the at least one first slave device and the at least one second slave device based on at least one time interval that is periodically allocated, wherein each of the at least one time interval includes at least one sub-time interval, and wherein the at least one sub-time interval includes (i) a first time interval in which the master device transmits data to the at least one first slave device and/or the at least one second slave device and (ii) a second time interval in which the master device receives data generated based on a user input from the at least one first slave device and/or the at least one second slave device.

A channel formed by the master device and the at least one first slave device may be the BIS channel.

The data transmitted by the master device to the at least one first slave device may be audio data related to a service provided to the master device and the at least one first slave device.

A sub-time interval, in which the audio data is transmitted, among the at least one sub-time interval included in one time interval may not be divided into the first time interval and the second time interval.

The audio data may be transmitted in an entire duration of the sub-time interval in which the audio data is transmitted.

Remaining sub-time intervals except for the sub-time interval, in which the audio data is transmitted, among the at least one time interval included in the one time interval may be divided into the first time interval and the second time interval.

A number of the remaining sub-time intervals except for the sub-time interval in which the audio data is transmitted may be the same as a number of the at least one second slave device.

Each of the remaining sub-time intervals except for the sub-time interval in which the audio data is transmitted may be respectively related to any one of the at least one second slave device.

The data transmitted by the master device to the at least one second slave device in the first time interval may be haptic feedback data related to a service provided to the master device and the at least one second slave device. The data generated based on the user input received by the master device from the at least one second slave device in the second time interval may be control data for operating the service provided to the master device and the at least one second slave device.

Based on there being no data transmitted in the first time interval, the data transmitted in the second time interval may be transmitted in the second time interval.

A channel formed by the master device and the at least one first slave device may be the CIS channel.

The data transmitted by the master device to the at least one first slave device in the first time interval may be audio data related to a service provided to the master device and the at least one first slave device.

The data generated based on the user input received by the master device from the at least one first slave device in the second time interval may be chat input data generated based on user voice recognition.

The data transmitted by the master device to the at least one second slave device in the first time interval may be haptic feedback data related to a service provided to the master device and the at least one second slave device.

The data generated based on the user input received by the master device from the at least one second slave device in the second time interval may be control data for operating the service provided to the master device and the at least one second slave device.

A number of the at least one sub-time interval may be the same as each of a number of the at least one first slave device and a number of the at least one second slave device.

In another one aspect of the present disclosure, there is provided a master device transmitting audio data in a short-range wireless communication system comprising a transmitter configured to transmit a radio signal; a receiver configured to receive the radio signal; at least one processor; and at least one computer memory operably connectable to the at least one processor, wherein the at least one computer memory is configured to store instructions that allow the at least one processor to perform operations based on being executed by the at least one processor, wherein the operations comprise forming a Connected Isochronous channel Stream (CIS) channel or a Broadcast Isochronous channel Stream (BIS) channel with at least one first slave device; forming the CIS channel with at least one second slave device; and transmitting and receiving data to and from the at least one first slave device and the at least one second slave device based on at least one time interval that is periodically allocated, wherein each of the at least one time interval includes at least one sub-time interval, and wherein the at least one sub-time interval includes (i) a first time interval in which the master device transmits data to the at least one first slave device and/or the at least one second slave device and (ii) a second time interval in which the master device receives data generated based on a user input from the at least one first slave device and/or the at least one second slave device.

Advantageous Effects

The present disclosure has an effect of transmitting and receiving data in a short-range wireless communication system.

The present disclosure also has an effect that a plurality of slave devices can transmit isochronous data to a master device with a low delay.

The present disclosure also has an effect that even if a plurality of slave devices transmits isochronous data, the plurality of slave devices can transmit the isochronous data to a master device with a delay of the same degree as when one slave device transmits the isochronous data.

The present disclosure also has an effect of improving a data transfer rate of a short-range wireless communication system consisting of master devices and slave devices.

The present disclosure also has an effect that a master device transmits audio data to slave devices at regular data packet intervals, and thus a bandwidth (BW) can be efficiently used.

The present disclosure also has an effect of performing both data transmission of a master device to a slave device and data transmission of a slave device to a master device within one time interval.

The present disclosure also has an effect of efficiently achieving timing management for transmission and reception of control data based on audio data and a user input.

The present disclosure also has an effect of reducing a transmission delay of control data.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

FIG. 1 is a schematic view illustrating an example of a wireless communication system using a Bluetooth low energy technology to which the present disclosure is applicable.

FIG. 2 illustrates an example of an internal block diagram of a device capable of implementing methods described in the present disclosure.

FIG. 3 illustrates an example of Bluetooth communication architecture to which methods described in the present disclosure is applicable.

FIG. 4 illustrates an example of a structure of a generic attribute profile (GATT) of Bluetooth low energy.

FIG. 5 is a flowchart showing an example of a connection procedure method in Bluetooth low energy technology to which the present disclosure is applicable.

FIG. 6 illustrates an example of a data transmission/reception method in a BR/EDR scheme for helping understanding of a method described in the present disclosure.

FIG. 7 illustrates another example of a data transmission/reception method in a BR/EDR scheme for helping understanding of a method described in the present disclosure.

FIG. 8 illustrates an example of a data packet format for data transmission/reception in a BR/EDR scheme for helping understanding of a method described in the present disclosure.

FIG. 9 illustrates another example of a data transmission/reception method in a BR/EDR scheme for helping understanding of a method described in the present disclosure.

FIG. 10 illustrates another example of a data transmission/reception method in a BR/EDR scheme for helping understanding of a method described in the present disclosure.

FIG. 11 illustrates another example of a data transmission/reception method in a BR/EDR scheme for helping understanding of a method described in the present disclosure.

FIG. 12 illustrates an example of using a game content using Bluetooth low energy for helping understanding of a method described in the present disclosure.

FIG. 13 illustrates an example of a protocol stack to which a method described in the present disclosure is applicable.

FIG. 14 illustrates an example of a data packet format capable of being used in a protocol stack to which a method described in the present disclosure is applicable.

FIG. 15 illustrates an example of a data transmission/reception method to which a method described in the present disclosure is applicable.

FIG. 16 illustrates an example on which a method described in the present disclosure is performed.

FIG. 17 illustrates an example of isochronous data transmission of a slave device.

FIG. 18 illustrates an example of a method of transmitting isochronous data of a slave device described in the present disclosure.

FIG. 19 illustrates another example of a method of transmitting isochronous data of a slave device described in the present disclosure.

FIG. 20 illustrates an example of a method of transmitting audio data using a short-range wireless communication technology.

FIG. 21 illustrates another example of a method of transmitting audio data using a short-range wireless communication technology.

FIG. 22 illustrates an example of performing a method of transmitting audio data described in the present disclosure.

FIG. 23 illustrates an example for helping understanding of a method of transmitting audio data described in the present disclosure.

FIGS. 35 and 36 illustrate other examples of a time interval defined for data transmission and reception through a Bluetooth isochronous channel.

FIG. 37 illustrates an effect of data transmission and reception based on a method described in the present disclosure.

FIG. 38 is a flowchart illustrating an example where a method of transmitting and receiving data in a short-range wireless communication system described in the present disclosure is performed by a master device.

MODE FOR INVENTION

Figure 24:
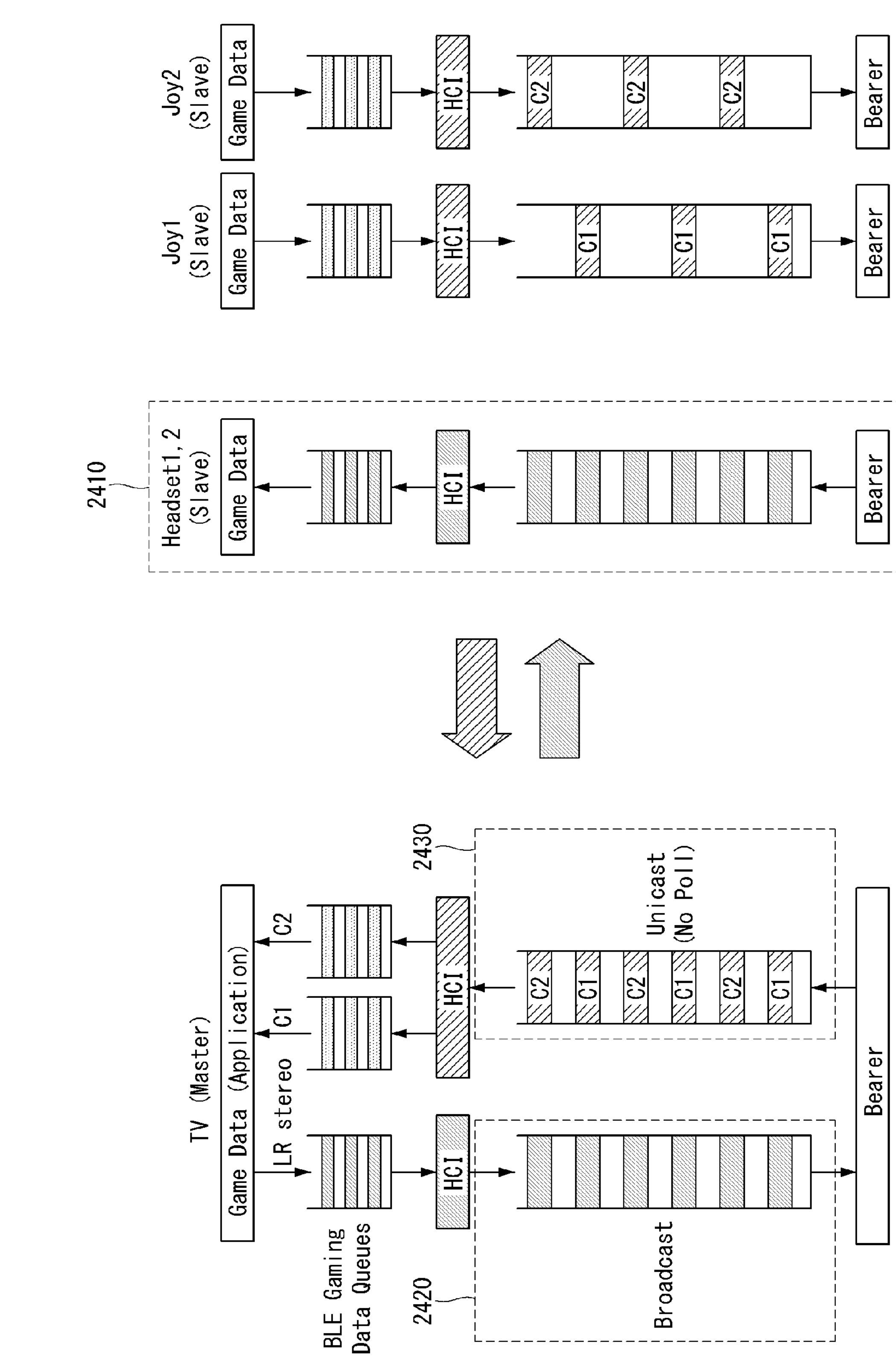
FIG. 24 illustrates another example of performing a method of transmitting audio data described in the present disclosure.

In order to help understanding of the present disclosure, the accompanying drawings which are included as a part of the Detailed Description provide embodiments of the present disclosure and describe the technical features of the present disclosure together with the Detailed Description. Like reference numerals principally designate like elements throughout the disclosure. Further, in describing the present disclosure, a detailed explanation of known related technologies may be omitted to avoid unnecessarily obscuring the subject matter of the present disclosure. Further, it is noted that the accompanying drawings are only for easily understanding the spirit of the present disclosure and it should not be interpreted that the spirit of the present disclosure is limited by the accompanying drawings.

Hereinafter, a method and an apparatus related with the present disclosure will be described in more detail with reference to drawings. In addition, a general term used in the present disclosure should be interpreted as defined in a dictionary or contextually, and should not be interpreted as an excessively reduced meaning. Further, a singular form used in the present disclosure may include a plural form if there is no clearly opposite meaning in the context. In the present application, a term such as "comprising" or "including" should not be interpreted as necessarily including all various components or various steps disclosed in the disclosure, and it should be interpreted that some component or some steps among them may not be included or additional components or steps may be further included. Suffixes "unit", "module", and "section" for components used in the following description are given or mixed in consideration of easy preparation of the disclosure only and do not have their own distinguished meanings or roles. The terms "first", "second", and the like are used to differentiate a certain component from other components, but the scope of should not be construed to be limited by the terms.

FIG. 1 is a schematic view illustrating an example of a wireless communication system using a Bluetooth low energy technology to which the present disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

FIG. 2 illustrates an example of an internal block diagram of a device capable of implementing methods described in the present disclosure.

As illustrated in FIG. 2, the master device 110 includes a user input interface 112, a power supply unit 113, a control unit 114, a memory unit 115, a network interface 116 including a Bluetooth interface, a storage 117, a display unit 118, and a multimedia module 119.

The user input interface 112, the power supply unit 113, the control unit 114, the memory unit 115, the network interface 116 including the Bluetooth interface, the storage 117, the display unit 118, and the multimedia module 119 are functionally connected to each other to perform methods described in the present disclosure.

Further, as illustrated in FIG. 2, a slave device (#1 and #2) 120 includes a user input interface 122, a power supply unit 123, a control unit 124, a memory unit 125, a network interface 126 including a Bluetooth interface, a storage 127, a display unit 128, and a multimedia module 129.

The user input interface 122, the power supply unit 123, the control unit 124, the memory unit 125, the network interface 126 including the Bluetooth interface, the storage 127, the display unit 128, and the multimedia module 129 are functionally connected to each other to perform methods described in the present disclosure.

The network interfaces 116 and 126 refer to units (or modules) capable of transmitting requests/responses, commands, notifications, indication/confirmation messages, etc., or data between devices using Bluetooth technology.

The memory units 115 and 125 refer to units implemented in various types of devices and refer to units in which various types of data are stored. The storages 117 and 127 refer to units that perform a function similar to a function of a memory.

The control units 114 and 124 refer to modules that control the overall operation of the master device 110 or the slave device 120, and request to transmit a message to the network interface or control to process a received message.

The control units 114 and 124 may include an application-specific integrated circuit (ASIC), another chipset, a logic circuit, and/or a data processing device.

The memory units 115 and 125 may include a read-only memory (ROM), a random access memory (RAM), a flash memory, a memory card, a storage medium, and/or other storage devices.

The memory units 115 and 125 may be inside or outside the processors 114 and 124 and may be connected to the processors 114 and 124 by various well-known means.

The display units 118 and 128 refer to modules for providing status information and message exchange information of the device to a user through a screen.

The power supply units 113 and 123 refers to modules that receive external power and internal power under the control of the control unit and supply power necessary for the operation of each component.

As discussed above, the BLE technology has a small duty cycle and can greatly reduce power consumption through a low data transfer rate.

FIG. 3 illustrates an example of Bluetooth communication architecture to which methods described in the present disclosure is applicable.

Specifically, FIG. 3 illustrates an example of architecture of Bluetooth low energy (LE).

As illustrated in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth disclosure using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: A method for providing an alarm service according to the distance.

Proximity: A method for exchanging battery information.

Time: A method for exchanging time information

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption may be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE disclosure, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices may scan the discoverable device through an advertising (or broadcast) physical channel.

Both of the discovering device and the discoverable device may already have been connected to other Bluetooth devices in a piconet Connecting Procedure A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type field of an advertising channel included in the header supports PDU types defined in Table 1 below.

TABLE 1

| | | | Permitted PHYs | | |
|---|---|---|---|---|---|
| PDU Type | PDU Name | Channel | LE 1M | LE 2M | LE Coded |
| 0000b | ADV_IND | Primary Advertising | ● | | |
| 0001b | ADV_DIRECT_IND | Primary Advertising | ● | | |
| 0010b | ADV_NONCONN_IND | Primary Advertising | ● | | |
| 0011b | SCAN_REQ | Primary Advertising | ● | | |
| | AUX_SCAN_REQ | Secondary Advertising | ● | ● | ● |
| 0100b | SCAN_RSP | Primary Advertising | ● | | |
| 0101b | CONNECT_IND | Primary Advertising | ● | | |
| | AUX_CONNECT_REQ | Secondary Advertising | ● | ● | ● |
| 0110b | ADV_SCAN_IND | Primary Advertising | ● | | |

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters a connection state when the device performing the connection request, i.E., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by the present disclosure.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 4.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.

handle: Address of attribute

Type: Type of attribute

Value: Value of attribute

Permission: Access authority to attribute

FIG. 5 is a flowchart showing an example of a connection procedure method in Bluetooth low energy technology to which the present disclosure may be applied.

A server transmits to a client an advertisement message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smartphone, etc.

As described above, in Bluetooth, communication is performed over a total of 40 channels through the 2.4 GHz band. Three channels among 40 channels as the advertising channels are used for exchanging sent and received for establishing the connection, which include various advertising packets.

The remaining 37 channels are used for data exchange after connection to the data channel.

The client may receive the advertisement message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.

Temporary Key: Key made for creating the STK

Short Term Key (LTK): Key value used for making encrypted connection between devices When the secure connection is performed in Phase 2, a 128-bit long term key (LTK) is generated.

Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

General of Isochronous Channel

With respect to an audio signal, audio streaming data or audio data may be periodically generated at an idle event interval.

The audio data is generated periodically (or at a specific time interval) based on characteristics thereof. The specific time interval at which the audio data is periodically generated may be expressed as the idle event interval. Each audio data is transmitted at each idle event interval. Further, each audio data may be transmitted in an entire duration or a partial duration of the idle event interval. When the audio streaming data generated periodically or regularly is transmitted using a BLE mechanism, an advertising and scanning procedure, a communication procedure, a disconnection procedure, etc. should be performed each time the generated audio data is transmitted/received. However, the audio data is generally periodically generated, and latency guarantee for audio data transmission is required regardless of an amount of the audio data.

However, when the advertising and scanning procedure, the communication procedure, the disconnection procedure, etc. should be performed each time newly generated audio data is transmitted, there is a problem in that latency occurs in audio data transmission.

Because the audio data transmission through hearing aids (HA) or headset, etc. has a comparatively small amount of data generated, it can obtain higher energy efficiency when using the BLE technology rather than the Bluetooth BR/EDR technology. However, as described above, because a data channel process of the BLE technology should perform advertising, connection, etc., every data transmission, the data transmission has large overhead, and in particular, latency guarantee absolutely required for the audio data transmission cannot be guaranteed.

Further, since the data channel process of the BLE technology transmits isolatedly generated data only as necessary, and has a purpose of increasing energy efficiency by inducing a deep sleep of the BLE device in other time domains. Therefore, it may be difficult to apply the data channel process of the BLE technology to transmission of periodically generated audio data.

Definition of Isochronous Channel and Mechanism Related Thereto

A new channel, i.e., an isochronous channel is defined to transmit periodically generated data using the BLE technology.

The isochronous channel is a channel used for transmitting isochronous data between devices (e.g., conductor-member) using an isochronous stream.

The isochronous data refers to data transmitted at a specific time interval, i.e., periodically or regularly.

That is, the isochronous channel may represent a channel in which the periodically generated data such as audio data or voice data is transmitted/received in the BLE technology.

The isochronous channel may be used for transmitting/receiving the audio data to/from a single member, a set of one or more coordinated members, or multiple members.

Further, the isochronous channel corresponds to a flushing channel which may be used for transmitting/receiving key data in an isochronous stream such as an audio streaming or other time domains.

When using a content of a game using Bluetooth low energy, a slave device which is a game controller and a master device which is a game machine body are connected. In this instance, a user input that is input to the slave device may be delivered to the master device depending on a connection method of the slave device and the master device, and an input delay which is a time required for processing the user input in the master device may occur.

When the slave device which is the game controller and the master device which is the game machine body are connected wiredly, a delay or jitter by the connection method may be close to 0 ms. Therefore, most of an input delay when the connection between the slave device and the master device is a wired connection may be a delay by software (SW) processing.

On the other hand, when the slave device which is the game controller and the master device which is the game machine body are connected wirelessly, a delay by a wireless connection method may occur, so a delay and jitter by the connection method may occur. In particular, in a wireless connection by a Bluetooth BR/EDR standard scheme, a delay and jitter may occur due to a 12.5 ms polling scheme which is a standard recommendation specification. Further, when multiple slave devices are connected to one master device, change widths of the delay and the jitter may further increase by an Async wireless connection scheme.

Data transmission/reception is available based on a sub event which is a smaller unit than a slot (625 us), which is a BR/EDR basic time unit, through an LE isochronous channel designed for audio transmission in which isochronism of data transmission is guaranteed, and the isochronism is guaranteed. Therefore, poll transmission of the master device is not required unlike the BR/EDR scheme.

The present disclosure proposes a method for transmitting a data traffic of the slave device, which is the game controller, on an LE isochronous channel. More specifically, the method proposed by the present disclosure relates to a method for guaranteeing the connection between multiple slave devices and the master device which is (i) within 1-ms delay and (ii) without jitter variation.

FIG. 6 illustrates an example of a data transmission/reception method in a BR/EDR scheme for helping understanding of a method described in the present disclosure. More specifically, FIG. 6 illustrates a BR/EDR data transmission/reception time interval from a master device perspective. The time interval may be a slot. In the BR/EDR, lengths of one transmission (Tx) slot and one reception (Rx) slot use a fixed time length of 625 us. In FIG. 6, reference numeral 610 denotes a time interval in which the master device transmits data to the slave device, and reference numeral 620 denotes a time interval in which the master device receives data from the slave device.

FIG. 7 illustrates another example of a data transmission/reception method in a BR/EDR scheme for helping understanding of a method described in the present disclosure. In FIG. 7, reference numeral 710 denotes a time interval in which the master device transmits data to the slave device, and reference numeral 720 denotes a time interval in which the master device receives data from the slave device. In FIG. 7, a length of one Tx/Rx slot is fixed to 625 us, and data transmission of each of the master device/the slave device is performed in a time division multiplexing (TDM) scheme. In this case, the data transmission of each of the master device/the slave device may be performed during time intervals of 1, 3, and 5-slot sizes. Further, the data transmission of the master device to the slave device may be performed in even slots, and data reception of the master device from the slave device may be performed in odd slots. Referring to the reference numeral 710 of FIG. 7, for example, the data transmission of the master device to the slave device may be performed during time intervals of 1-slot size and 5-slot size. Further, referring to the reference numeral 720 of FIG. 7, for example, the data reception of the master device from the slave device may be performed during time intervals of 1-slot size and 3-slot size.

FIG. 8 illustrates an example of a data packet format for data transmission/reception in a BR/EDR scheme for helping understanding of a method described in the present disclosure. Referring to FIG. 8, it can be seen that a data packet format in the BR/EDR scheme is configured to include an ACCESS CODE field, a HEADER field, and a PAYLOAD field.

FIG. 9 illustrates another example of a data transmission/reception method in a BR/EDR scheme for helping understanding of a method described in the present disclosure.

More specifically, FIG. 9 illustrates an example of a data transmission/reception method of the BR/EDR scheme based on a Synchronous Connection Oriented (SCO) link. For the data transmission/reception of the BR/EDR scheme based on the SCO link, HV1 (⅓ FEC), HV2 (⅔ FEC), and HV3 (No FEC) packets may be used. SCO logical transport in the data transmission/reception of the BR/EDR scheme based on the SCO link may be transmission between symmetric points between the master device and the slave device. The data transmission/reception based on the SCO link may be preferably used for voice communication.

FIG. 10 illustrates another example of a data transmission/reception method in a BR/EDR scheme for helping understanding of a method described in the present disclosure. More specifically, FIG. 10 illustrates an example of a data transmission/reception method of the BR/EDR scheme based on an Asynchronous Connection-Less (ACL) link. For the data transmission/reception method of the BR/EDR scheme based on the ACL link, the master device may exchange a data packet with all the slave devices per slot in a non-reserved slot for the SCO logical transport. A packet exchange connection between (i) the master slave and (ii) all active slaves participating in a piconet may be provided based on the ACL logical transport. Further, both asynchronous and isochronous services may be supported based on the ACL link. Only a single ACL logical transport has to exist between two devices transmitting and receiving data based on the ACL link. Packet retransmission may be applied to the ACK packet in order to guarantee data integrity.

FIG. 11 illustrates another example of a data transmission/reception method in a BR/EDR scheme for helping understanding of a method described in the present disclosure. In the data transmission/reception in the BR/EDR scheme, since an asynchronous channel is used for data transmission of the slave device which is the game controller, it is difficult to guarantee that a controller of the slave device transmits data depending on a polling cycle decided by a host of the slave device.

In FIG. 11, reference numerals 1110 to 1150 denote examples where the polling cycles are 1.25 ms, 2.5 ms, 5 ms, 10 ms, and 12.5 ms, respectively. Since a minimum slot length of the BR/EDR is 625 us, a sum of lengths of slots for transmitting a poll and data may be at least 625 us×2=1.25 ms. When the poll and the data are transmitted based on a minimum cycle of 1.25 ms, the master device may transmit data 800 times per second. However, in the asynchronous transmission method, even if a transmission cycle is fixed at the host, the data is transmitted by a best effort method in the controller, so it is difficult to transmit the data at a regular time interval in an air interface. That is, referring to the reference numeral 1110 of FIG. 11, the pole and the data are configured to be transmitted at a cycle of 1.25 ms, but a time space in which the poll and the data are not transmitted is generated, and as a result, a jitter variation occurs. Referring to the reference numerals 1120 to 1150 of FIG. 11, it may be confirmed that the pole and the data may be transmitted at cycles of 2.5 ms, 5 ms, 10 ms, and 12.5 ms in order to use other traffic, but the examples of the reference numerals 1120 to 1150 of FIG. 11 have the same problem as the example of the reference numeral 1110.

FIG. 12 illustrates an example of using a game content using Bluetooth low energy for helping understanding of a method described in the present disclosure.

1210: Referring to FIG. 12, the slave device which is the game controller is wiredly or wirelessly connected to the master device which is the game machine body. Here, the master device may be a machine such as a PC or a game machine. When the slave device is wiredly connected to the master device, the two devices may be connected by a USB method and may follow a poll/data transmission method according to a USB HID standard. A polling cycle of the wired USB method may be set to 2 ms, 5 ms, and 10 ms from at least 1 ms. When the slave device is wirelessly connected to the master device, the two devices may be connected by a Bluetooth method and may follow a poll/data transmission method according to the Bluetooth HID standard. A polling cycle of the Bluetooth method may be set to 2.5 ms, 5 ms, 10 ms, and 12.5 ms from at least 1.25 ms.

1220: An input lag for the slave device which is the game controller may be determined based on (i) sensing delay and (ii) polling delay which are hardware elements, and (i) OS delay and (ii) game app delay which are software elements. Here, the sensing delay refers to a time it takes for the slave device which is a microcontroller (MC) to recognize a user input value that is input to the slave device. Further, the polling delay refers to a time it takes for user input data to be transmitted from the slave device to the master device through the USB or Bluetooth. Further, the OS delay refers to a time it takes for a PC or game machine OS to read a controller reception buffer value, and the game app delay refers to a time it takes for the game SW to read OS data.

1230: Referring to reference numeral 1230 of FIG. 12, it can be seen that in a wireless Bluetooth method, the polling delay exerts a largest influence on the input delay.

FIG. 13 illustrates an example of a protocol stack to which a method described in the present disclosure is applicable. Referring to FIG. 13, a protocol stack to which the method described in the present disclosure is applicable may include a physical transport(s), a physical channel(s), a physical link(s), a logical transport(s), and a logical link(s). In the present disclosure, the physical channel may mean a synchronized Bluetooth baseband-compliant RF hopping sequence.

The piconet may mean a set of Bluetooth devices sharing the same physical channel defined by the master parameters (clock and BD_ADDR).

The physical link may be a baseband level link between two devices configured using paging. The physical link may include a transmission slot sequence of a physical channel alternating between a transmission slot of the master device and a transmission slot of the slave device.

Further, an LE isochronous physical channel may have a pseudo-random sequence of the PHY channel, and three additional parameters provided by a master or non-link type broadcaster as a feature. A first parameter may be a channel map representing a PHY channel set, and a second parameter may be a pseudo random number used as an index for all sets of the PHY channel. A third parameter may be a timing of a first data packet. A timing of a first packet of CIS may be provided to a link layer message transmitted in an ACL link linked by the master in a CIS setting step. A timing of a first packet of BIS may be referenced in a periodic advertising event related to the BIS.

FIG. 14 illustrates an example of a data packet format capable of being used in a protocol stack to which a method described in the present disclosure is applicable. Referring to FIG. 14, a data packet format capable of being used in a protocol stack to which a method described in the present disclosure is applicable includes a preamble field, an access address field, a PDU header field, a PDU payload field, MIC, and a CRC field. The uses of the respective fields are illustrated in FIG. 14.

FIG. 15 illustrates an example of a data transmission/reception method to which a method described in the present disclosure is applicable. More specifically, FIG. 15 is a diagram related to a data transmission method through the LE isochronous channel. FIG. 15(*a*) is related to data transmission of a unicast scheme through a connected isochronous channel (CIS), and FIG. 15(*b*) is related to data transmission of a broadcast scheme through a broadcast isochronous channel (BIS).

The LE isochronous channel is a channel that guarantees isochronism, and it may be guaranteed that a controller of the Bluetooth device transmits data according to a polling cycle set by a host of the Bluetooth device through the LE isochronous channel. sub_interval similar to the slot defined in the BR/EDR scheme may be used in the LE isochronous channel.

sub_interval of a unicast channel based on the CIS may have a length of at least 400 us and may be adjusted in units of 30 us. sub_interval of a broadcast channel based on the BIS may have a length of at least 300 us and may be adjusted in units of 30 us.

ISO_interval may be set to a length longer than sub_interval for managing a transmission buffer. When a time as long as the ISO_interval elapsed, the transmission buffer may be flushed, and new data may be transmitted.

In the data transmission of the unicast scheme, bidirectional communication between the master device and the slave device may be performed using the connected isochronous channel (CIS). In the CIS, a connected device may transmit isochronous data even in any direction. The size of the data may be fixed or variable, and there may be a frame or no frame. The isochronous data may be transmitted in an LE-S or LE-F logical link by using the CIS logical transport. Each CIS should be connected to the ACL. In the CIS, since (i) transmission of packets having various sizes and (ii) transmission of one or more packets in each isochronous event are supported, various data rates may be supported. Data traffic may be transmitted/received between the devices unidirectionally or bidirectionally. In the CIS, an acknowledgment protocol for enhancing reliability of packet delivery may be defined.

In the data transmission of the broadcast method, unidirectional communication between the master device and the slave device may be performed by using the broadcast isochronous channel (BIS). That is, referring to FIG. 15(*b*), in the data transmission of the broadcast method, data may be broadcasted only in (i) a direction from the slave device to the master device or (ii) a direction from the master device to the slave device. The BIS is a logical transport which allows the device to transmit the isochronous data. The isochronous data may have a frame or no frame. In the BIS, since (i) transmission of packets having various sizes and (ii) transmission of one or more packets in each isochronous event are supported, various data rates may be supported. The data traffic may be performed unidirectionally in the broadcasting device. As a result, in the BIS, the acknowledgment protocol is not defined, and it is difficult to intrinsically guarantee the reliability of broadcast isochronous traffic. The BIS may support multi-retransmission in order to enhance the reliability of the packet delivery.

In the LE isochronous channel, the isochronism of data transmission/reception is guaranteed, and the master device and the slave device share timing for data transmission/reception. Therefore, a master poll required for timing synchronization for the data transmission/reception between the master device and the slave device in the asynchronous channel does not need to be transmitted to the slave device.

FIG. 16 illustrates an example on which a method described in the present disclosure is performed.

S1610: First, the master device and the slave device may discover each other and form the connection.

S1620: Next, the master device and the slave device may form a connection for isochronous data transmission. In this case, the connection for isochronous data transmission may be unicast CIS.

S1630: Next, when there is input data of the user (e.g., a controller button input, a joystick input, etc.), the slave device which is a game controller may transmit data to the master device based on a notification method in a slave data transmission interval. In this case, since a controller of the slave device knows a slave data transmission timing, the master device may not transmit a poll to the slave device. Therefore, when there is input data of the user, the slave device may transmit the input data to the master device without the poll reception from the master device. On the contrary, when there is no input data of the user, the slave device may not perform data transmission to the master device in the slave data transmission interval without the poll reception from the master device. Through this method, there is an effect that the slave device does not need to manage an Rx buffer for receiving data (poll) from the master device. Further, there is an effect that the master device does not need to manage a timeout for reception of data that the slave device transmits to the master device within any sub_interval after the poll transmission.

FIG. 17 illustrates an example of isochronous data transmission of a slave device. More specifically, FIG. 17 illustrates an example of an operation in which a user input is input to one slave device, and isochronous data for the input user input is transmitted on the LE isochronous channel by the slave device. In FIG. 17, reference numeral 1710 denotes an operation in which the input data of the user is input to the slave device, and reference numeral 1720 denotes an operation in which the slave device transmits the input data on the LE isochronous channel. In FIG. 17, transmission of the isochronous data on the LE isochronous channel is performed based on a periodically allocated transmission interval. The transmission interval includes (i) a transmission interval (a first transmission interval) 1711 for data transmission from the master device to the slave device, and ii) a transmission interval (a second transmission interval) 1721 for data transmission from the slave device to the master device.

Referring to FIG. 17, when there is input data of the user in the transmission interval, the slave device performs transmission of isochronous data for the input data in a transmission interval receiving the input data. On the contrary, when there is no input data of the user in the transmission interval, the slave device omits transmission of isochronous data for the input data in a transmission interval receiving the input data.

Hereinafter, an example where a plurality of slave devices is connected to the master device to transmit the isochronous data will be described with reference to FIGS. 18 and 19.

Embodiment 1

This embodiment relates to a method in which when there are two or more slave devices that are a game controller, data transmission intervals of the slave devices are crossingly used between the slave devices. In the present embodiment, transmission intervals configured for a master device and each of the slave devices connected to the master device may have the same form.

FIG. 18 illustrates an example of a method of transmitting isochronous data of a slave device described in the present disclosure. More specifically, FIG. 18 illustrates an example in which two slave devices 120 transmit isochronous data to a master device 110. In FIG. 18, the two slave devices may crossingly use transmission intervals of the slave devices. Reference numeral 1810 of FIG. 18 shows a form in which data is sent from a bearer of each slave device side to controller Tx queues of the slave devices. For such an operation, the master device may be in a state of forming a unicast connection with all the slave devices in order to share a transmission timing with the slave devices. In FIG. 18, control signals (isochronous data) of the slave devices may be transmitted based on multi-MAC. Reference numeral 1820 of FIG. 18 shows a form in which data is received from a bearer to a controller Rx queue of the master side. For convenience of description, FIG. 18 illustrates an example in which two slave devices are connected to the master device, by way of example, but the present disclosure is not limited thereto. The contents described above can be equally/similarly applied even when more than two slave devices are connected to the master device.

In the present embodiment, (i) a percentage occupied by a transmission interval (first transmission interval), in which the master device transmits data to the slave device, with respect to the entire transmission duration and (ii) a percentage occupied by a transmission duration (second transmission duration), in which the slave device transmits data to the master device, with respect to the entire duration of the transmission interval are equally set. Here, the first transmission interval may be understood as a time interval that is configured so that the slave device receives data from the master device (expects to receive data). Further, since there are two or more slave devices that transmit the isochronous data to the master device, it may be understood that a different transmission interval is allocated to each of the slave devices connected to the master device. The number of different transmission intervals may be equal to the number of slave devices connected to the master device.

Additionally, the slave device may receive, from the master device, information (transmission interval allocation scheme information) on a scheme in which the different transmission intervals are allocated to the slave devices connected to the master device. Each transmission interval in which the slave devices connected to the master device transmit the isochronous data may be determined based on the transmission interval allocation scheme information.

Further, since a different transmission interval is allocated to each of the plurality of slave devices connected to the master device, a specific time interval including the different transmission intervals may be configured so that each of the plurality of slave devices can have a data transmission opportunity once. In this case, the specific time interval may be understood as being periodically repeated. Further, a scheme in which the different transmission intervals are allocated to the plurality of slave devices within the specific time interval may be configured to be always the same. That is, the scheme in which the different transmission intervals are allocated to the plurality of slave devices within the specific time interval may be configured to be the same every specific time interval. As another embodiment, the scheme in which the different transmission intervals are allocated to the plurality of slave devices within the specific time interval may be updated according to a predetermined interval. For example, the scheme in which the different transmission intervals are allocated to the plurality of slave devices within the specific time interval may be changed every specific time interval. In this case, the time interval allocation scheme changed according to the update may be randomly determined. For example, when four slave devices are connected to the master device, a time interval allocation scheme within a specific time interval for the slave devices may be updated every predetermined cycle as in (1-2-3-4)→(2-1-4-3)→(3-4-2-1). When the scheme in which the different transmission intervals are allocated to the plurality of slave devices within the specific time interval is changed at a predetermined cycle, there is an effect that an equity between users participating in a game can be guaranteed.

Embodiment 2

This embodiment relates to a method in which a transmission interval configured in a master device is the same as the embodiment 1, and transmission intervals configured for slave devices connected to the master device are defined in different types.

FIG. 19 illustrates another example of a method of transmitting isochronous data of a slave device described in the present disclosure. More specifically, FIG. 18 illustrates an example in which two slave devices 120 transmit isochronous data to a master device 110. In FIG. 19, two slave devices transmit the isochronous data in the same transmission interval, and the transmission intervals configured for the two slave devices may be defined as different forms. More specifically, in FIG. 19, reference numeral 1910 denotes a transmission interval configured in the master device, reference numeral 1920 denotes a transmission interval configured in one slave device of the two slave devices, and reference numeral 1930 denotes a transmission interval configured in the other slave device. The transmission intervals are configured as illustrated in FIG. 19, and as a result, even if several slave devices are used, transmission of all the slave devices can be performed within one transmission interval, thereby obtaining an effect that the delay can be reduced. That is, the master device can receive the isochronous data from all the slave devices within one sub-event.

In the present embodiment, with respect to the slave device, (i) a percentage occupied by a transmission interval (first transmission interval), in which the slave device receives data from the master device, with respect to the entire duration of a transmission interval of the slave device and (ii) a percentage occupied by a transmission interval (second transmission interval), in which the slave device transmits data to the master device, with respect to the entire duration of the transmission interval may be differently set. Further, (i) the percentage occupied by the first transmission interval with respect to the entire duration of the transmission interval may be greater than (ii) the percentage occupied by the second transmission interval with respect to the entire duration of the transmission interval.

When the plurality of slave devices transmit the isochronous data to the master device in accordance with the present embodiment, the isochronous data transmission of each of the plurality of slave devices may be performed in one transmission interval. In this case, a ratio between (i) the first transmission interval and (ii) the second transmission interval may be set to a different value for each of the plurality of slave devices.

Additionally, each of the plurality of slave devices may receive, from the master device, information on the ratio between (i) the first transmission interval and (ii) the second transmission interval.

In the present embodiment, with respect to the master device, (i) a percentage occupied by a transmission interval, in which the master device transmits data to the slave device, with respect to an entire duration of a transmission interval and (ii) a percentage occupied by a transmission interval, in which the master device receives data from the slave device, with respect to the entire duration of the transmission interval may be equally set. In this case, at least one isochronous data transmitted by each of the plurality of slave devices may be received in a transmission interval, configured in the master device, in which the master device receives data from the slave device.

When it is considered that a minimum polling interval of a wired controller is 1 ms, if an LE isochronous channel is used based on the method described in the present disclosure, an earlier polling interval than the wired controller may be secured. Further, since a sub-event of the LE isochronous channel can be controlled in units of 30 us, an average delay may be calculated by controlling the polling interval according to game requirements. Since the LE isochronous channel can always expect data to be transmitted at a constant time unlike the asynchronous channel of the BR/EDR, a jitter variation amount can be reduced compared to the existing BR/EDR.

According to the method described in the present disclosure, since the master device may not send the poll to the slave device, and different data may be transmitted in the transmission interval of the master device, data transmission efficiency can be enhanced twice compared to the existing BR/EDR method. Additionally, even if the plurality of slave devices are used, the delay is not increased, but the delay may be maintained the same as when only one slave device is used.

FIG. 20 illustrates an example of a method of transmitting audio data using a short-range wireless communication technology. More specifically, FIG. 20 illustrates a method of transmitting audio data based on Bluetooth BR/EDR. Referring to FIG. 20, transmission of the audio data based on the Bluetooth BR/EDR may be performed based on a DH5 scheme in which (1) five audio data (2001) is transmitted from the master device to the slave device, and (2) ACK (2003) is transmitted from the slave device to the master device.

The transmission of the audio data based on the Bluetooth BR/EDR has a problem that no specific criterion exists regarding how to set a length (100 ms, 500 ms, 1 sec) of an entire bandwidth (BW) duration for buffer management of the master device/the slave device. The transmission of the audio data based on the Bluetooth BR/EDR also has a problem that the audio data is performed based on the DH5 scheme of an asynchronous channel, but it cannot be accurately predicted how DH5 consisting of five audio data and ACK will be deployed in an actual air interface. That is, a controller of the master device receives a command of a host and asynchronously sends a packet based on a channel situation and a buffer situation. In this case, all the DH5 may be transmitted consecutively (contiguously) as illustrated in (a) of FIG. 20, may be transmitted at irregular intervals depending on buffer spare as illustrated in (b) of FIG. 20, and may be transmitted at equal intervals (periodically) as illustrated in (c) of FIG. 20. The audio data transmission method illustrated in (c) of FIG. 20 may be similar to an isochronous data transmission method in a Bluetooth LE isochronous channel.

FIG. 21 illustrates another example of a method of transmitting audio data using a short-range wireless communication technology. More specifically, FIG. 21 illustrates a method in which audio data transmission and poll/data transmission/reception based on Bluetooth BR/EDR are performed together. FIG. 21 illustrates an example of audio data transmission and poll/data transmission/reception in a picont consisting of one master device and two slave devices. Here, the two slave devices may be a controller and a headset, respectively. In order to support DH5, that is an audio data packet, in a picont controlled by one master device, a joystick/controller polling period has to be greater than or equal to 5 ms. That is, since a sum of the time (625 us*2) it takes for the master device to transmit the poll to the slave device, that is a joystick/controller, and to receive control data, and the time (625 us*6) it takes for the master device to transmit five audio data to the slave device and to receive ACK therefor equals 5 ms, the joystick/controller polling period may need to be greater than or equal to 5 ms. However, because the audio data packet is transmitted using the asynchronous channel, an exact transmission time of the DH5 packet cannot be predicted. Thus, a buffer length needs to be set large, and hence, there occurs a delay time of the control data that the slave device that is the joystick/controller transmits to the master device.

When SBC 1 channel that is BR/EDR standard codec is 4096-byte sampled and is compressed by ¼, a size of an audio data packet is 1024 bytes. Since a maximum size of DH5 is 226 bytes, five DH5 packets may be required per one channel (226*5=1130>1024). According to A2DP that is audio data transmission profile standard, two left and right channels may be transmitted to one joint stereo, and a 20-30% coding gain can be obtained compared to L/R stereo. About eight DH5 packets are required to transmit one sample of L/R stereo, but the transmission arrangement of the eight DH5 packets cannot be accurately predicted. Therefore, the buffer length may need to be set sufficiently large. AVDTP that is audio transmission protocol standard uses RTP, and FEC mechanism is used to guarantee QoS of packet transmission.

FIG. 22 illustrates an example where a method of transmitting audio data described in the present disclosure is performed.

More specifically, (a) of FIG. 22 illustrates an example of audio data transmission based on Bluetooth BR/EDR. In (a) of FIG. 22, one master device and four slave devices constitute one piconet. Here, the master device transmits audio data to two slave devices of the four slave devices and receives data generated based on a user input from the remaining two slave devices. The two slave devices to which the master device transmits the audio data may be headsets, and the two slave devices from which the master device receives the data generated based on the user input may be game controllers. The audio data transmission and the reception of the data generated based on the user input may be performed in a unicast scheme. Referring to reference numeral 2211 of FIG. 22(*a*), the master device transmits the audio data in the unicast scheme and receives the data generated based on the user input in the unicast scheme, and thus a bandwidth (BW) may be insufficient, and data packet intervals between the audio data and the data generated based on the user input may be irregular.

(b) of FIG. 22 illustrates an example of audio data transmission based on a Bluetooth LE isochronous channel described in the present disclosure. In (b) of FIG. 22, one master device and four slave devices constitute one piconet. Here, the master device transmits audio data to two slave devices of the four slave devices and receives data generated based on a user input from the remaining two slave devices. The two slave devices to which the master device transmits the audio data may be headsets, and the two slave devices from which the master device receives the data generated based on the user input may be game controllers. The audio data transmission may be performed in a broadcast scheme, and the reception of the data generated based on the user input may be performed in a unicast scheme. In FIG. 22(*b*), the master device transmits the audio data in the broadcast scheme and receives the data generated based on the user input in the unicast scheme, and thus data packet intervals between the audio data and the data generated based on the user input can be regular, and latency can be reduced. In addition, referring to reference numeral 2221 of FIG. 22(*b*), a bandwidth (BW) can be efficiently used, and thus a spare bandwidth can exist.

FIG. 23 illustrates an example for helping understanding of a method of transmitting audio data described in the present disclosure. More specifically, FIG. 23 illustrates a method in which a master device (i) transmits audio data and (ii) receives control data from a slave device based on Bluetooth BR/EDR. In FIG. 23, one master device and four slave devices constitute one piconet. Here, the master device transmits audio data to two slave devices of the four slave devices and receives control data generated based on a user input from the remaining two slave devices. Both the audio data and the control data may be transmitted and received based on a unicast scheme.

Referring to FIG. 23, p1 denotes a poll for indicating a transmission timing of control data c1 of joy1 that is the slave device, and p2 denotes a poll for indicating a transmission timing of control data c2 of joy2 that is the slave device. The slave device joy1 receiving the p1 may transmit, to the master device, the control data c1 generated based on the user input as a response to the p1 based on a unicast scheme. Further, the slave device joy2 receiving the p2 may transmit, to the master device, the control data c2 generated based on the user input as a response to the p2 based on the unicast scheme.

In FIG. 23, LR denotes audio data transmitted to slave devices Headset 1 and Headset 2. Referring to p1 and p2 transmission timings of the master device of FIG. 23, a sufficient buffer time for transmitting the audio data may be configured between the p1 and the p2. Referring to reference numeral 2310 of FIG. 23, according to the audio data transmission and control data reception method in FIG. 23, a BW may be insufficient due to the buffer time, and a situation in which the slave device Headset 2 cannot receive the audio data may occur.

FIG. 24 illustrates another example where a method of transmitting audio data described in the present disclosure is performed. In FIG. 24, one master device and four slave devices constitute one piconet. Here, the master device transmits audio data to two slave devices Headset1 and Headset2 of the four slave devices and receives data generated based on a user input from the remaining two slave devices Joy1 and Joy2. The two slave devices to which the master device transmits the audio data may be headsets, and the two slave devices from which the master device receives the data generated based on the user input may be game controllers. The audio data transmission may be performed in a broadcast scheme, and the reception of the data generated based on the user input may be performed in a unicast scheme. In FIG. 24, the master device transmits the audio data in the broadcast scheme and receives the data generated based on the user input in the unicast scheme, and thus data packet intervals between the audio data and the data generated based on the user input can be regular, and latency can be reduced.

Referring to reference numeral 2420 of FIG. 24, the master device may transmit the audio data to at least one first slave device Headset1 and Headset2 based on the broadcast scheme. Referring to reference numeral 2430 of FIG. 24, the master device may receive the data generated based on the user input from at least one second slave device Joy1 and Joy2 based on the unicast scheme. In this instance, (i) a transmission of the audio data and (ii) a reception of the data generated based on the user input may be performed based on at least one time interval periodically allocated for (i) the transmission of the audio data and (ii) the reception of the data generated based on the user input, illustrated in reference numeral 2223 of (b) of FIG. 22. Each of the at least one time interval may include (i) a first time interval (2223-1 of (b) of FIG. 22) for the transmission of the audio data and (ii) a second time interval (2223-2 of (b) of FIG. 22) for the reception of the data generated based on the user input.

Referring again to the reference numeral 2420 of FIG. 24, the master device may divide the audio data based on a time length of the at least one time interval to generate at least one sub-audio data. In this instance, the at least one sub-audio data may be transmitted in the same specific number of time intervals as the number of the at least one sub-audio data among the at least one time interval. That is, each of the at least one sub-audio data may be transmitted in one time interval among the specific number of time intervals.

The specific number of time intervals in which each of the at least one sub-audio data is transmitted may be contiguously assigned in a time domain, as illustrated in the reference numeral 2223 of (b) of FIG. 22. That is, referring to (b) of FIG. 22, at least one sub-audio data (LR) may be transmitted in contiguous time intervals (12/34/56/78), respectively. In this instance, each of the at least one sub-audio data may be transmitted in the first time interval (2223-1 of (b) of FIG. 22) of the one time interval, and the data of the slave device generated based on the user input may be transmitted in the second time interval (2223-2 of (b) of FIG. 22) of the one time interval. The first time interval may be configured such that a time interval in which the master device transmits the poll to the slave device is used in the audio data transmission based on the broadcast scheme in the existing Bluetooth BR/EDR method.

Referring to the reference numeral 2221 of (b) of FIG. 22, (i) after all the sub-audio data is transmitted and (ii) before new audio data is generated, only data based on the user input may be transmitted in a time interval after the specific number of time intervals among the at least one time interval. Each of the at least one time interval may be a unit of time at which frequency hopping is performed.

Embodiment 3

This embodiment relates to a method of setting a time interval so that both (i) data transmission from a master device to a slave device and (ii) data reception of the master device from the slave device are performed in one time interval for data transmission and reception between the master device and the slave device. More specifically, in the present embodiment, the one time interval includes at least one sub-time interval, and both (i) data transmission from the master device to the slave device and (ii) data reception of the master device from the slave device can be performed in one sub-time interval. The time interval may be an isochronous (ISO) interval, and the sub-time interval may be a sub-interval.

Figure 25:
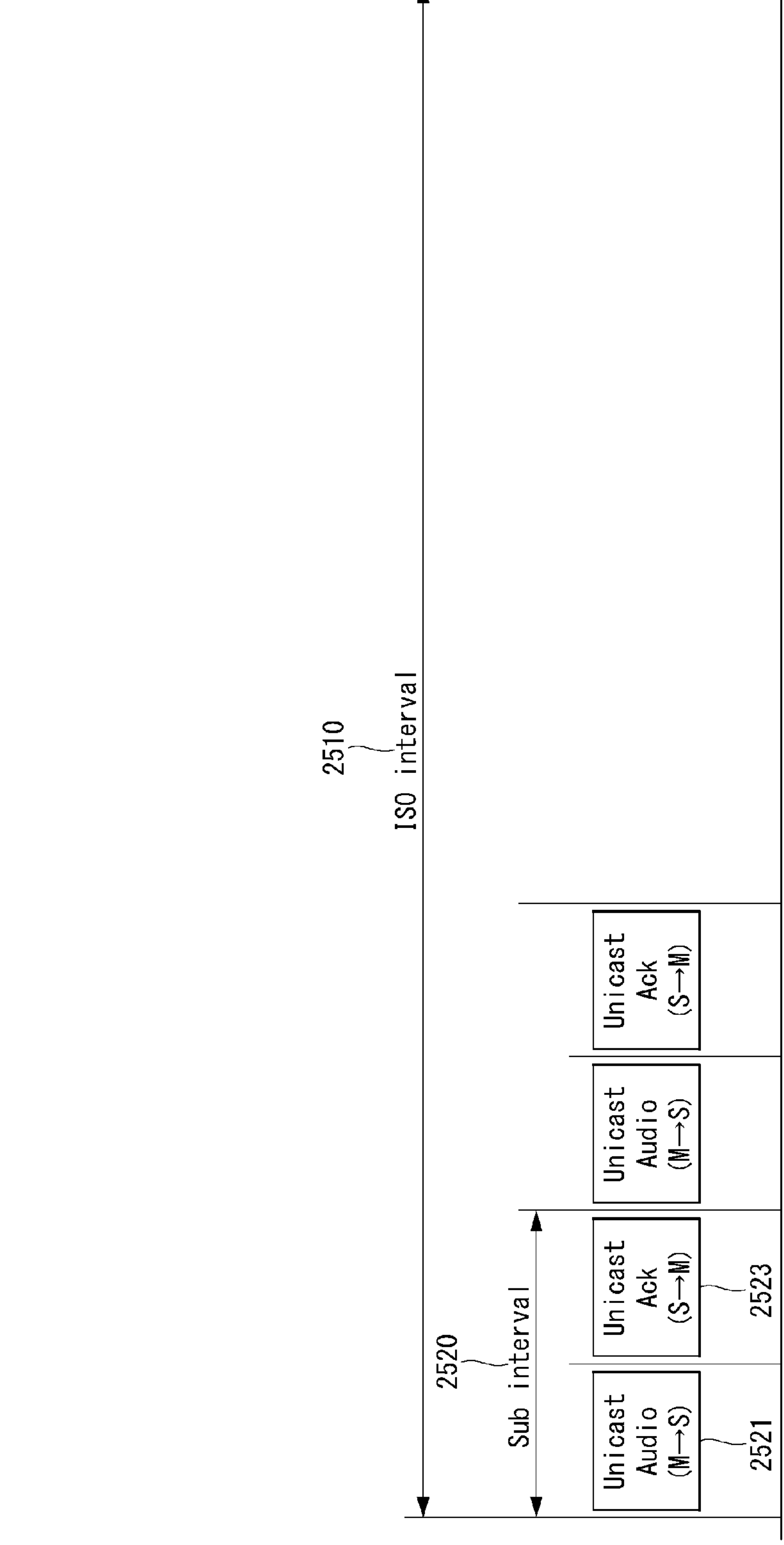
FIG. 25 illustrates an example of a time interval defined for data transmission and reception through a Bluetooth isochronous channel.

FIG. 25 illustrates an example of a time interval defined for data transmission and reception through a Bluetooth isochronous channel.

In FIG. 25, a time interval defined for data transmission and reception through an isochronous channel is defined such that only a portion of the entire duration of one ISO interval 2510 is used as a sub-interval 2520, and a remaining time interval is flushed for data transmission. More specifically, in FIG. 25, the ISO interval 2510 includes two sub-intervals 2520, and the remaining time interval is flushed for data transmission. The portion of the ISO interval used as the sub-interval may include a first interval 2521 for data transmission of the master device to the slave device and a second interval 2522 for ACK transmission of the slave device to the master device. In this instance, data transmitted from the master device to the slave device in the first interval may be audio data, and the audio data may be data having a relatively larger size than ACK transmitted from the slave device to the master device.

In FIG. 25, buffer management between the master device and the slave device may be performed in units of the ISO interval 2510, and the master device may store data for error recovery for n times the time of the ISO interval 2510 based on a flush timeout (FT) parameter.

The following parameters in addition to the FT parameter may be defined for the data transmission and reception based on the ISO interval 2510.

Number of Sub Event (NSE): it is the number of sub-events transmitted in the ISO interval 2510 and may have the same value as the number of sub-intervals 2520.

Burst Number (BN): it is the number of new events transmitted in the ISO interval 2510.

Flush Timeout (FT): ISO time in which a transmission end manages data at a buffer. The FT is defined in units of the ISO interval 2510, and if a value of the FT is 0, the transmission end flushes a transmission buffer regardless of whether data transmission is successful or not in one ISO interval 2510.

The value of the NSE always has a value greater than or equal to the BN and is a multiple of the value of the BN. A multiple ratio of the NSE and the BN is the number of ISO intervals 2510 used for error recovery.

Figure 26:
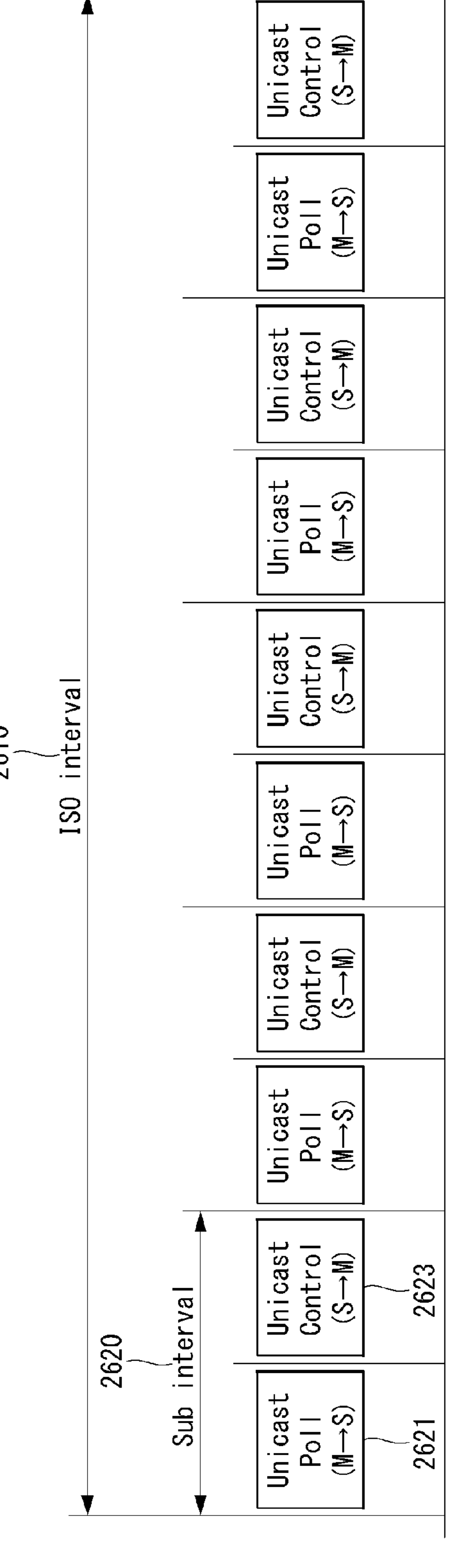
FIG. 26 illustrates another example of a time interval defined for data transmission and reception through a Bluetooth isochronous channel.

FIG. 26 illustrates another example of a time interval defined for data transmission and reception through a Bluetooth isochronous channel.

FIG. 26 illustrates an example where a master device transmits a poll to a slave device, and the slave device transmits data to the master device based on the received poll. Here, the master device and the slave device may be devices receiving a Bluetooth gaming service, and the data transmitted by the slave device to the master device may be data generated based on a user input related to the Bluetooth gaming service. The slave device may be a game controller device.

In the example of FIG. 26, a time interval defined for data transmission and reception through an isochronous channel is defined such that the entire duration of one ISO interval 2610 is used as a sub-interval 2620. The sub-interval 2620 included across the entire duration of the ISO interval 2610 may be used for data transmission of the slave device to the master device. The sub-interval 2620 may include a first interval 2621 for poll transmission of the master device to the slave device and a second interval 2622 for poll transmission of the slave device to the master device. The poll transmitted by the master device to the slave device may be data with a relatively smaller size than the data transmitted by the slave device to the master device.

A reason why the ISO interval 2610 is defined with the structure illustrated in FIG. 26 is that the slave device should always be prepared so that data can be input at a certain cycle when the ISO interval 2610 is defined to provide the Bluetooth gaming service. In other words, audio data has time to recover when an error occurs, but if data based on a user input entered at a rapid cycle (1 ms, 2 ms, . . . ) fail to be processed within a certain period of time, it may be more advantageous from an overall transport management perspective to drop the unprocessed data rather than to recover the error. Therefore, gaming data should be designed with real-time priority over reliability of data transmission in an ISO interval for gaming data transmission. As a result, there may be no need to manage the buffer at the transmitting end by setting the FT to a value of 1 or more.

Figure 27:
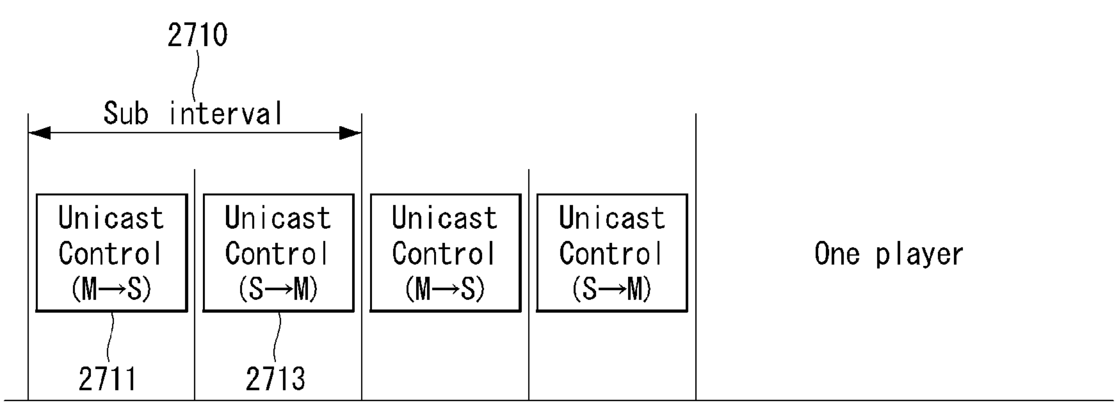
FIG. 27 illustrates another example of a time interval defined for data transmission and reception through a Bluetooth isochronous channel.

FIG. 27 illustrates another example of a time interval defined for data transmission and reception through a Bluetooth isochronous channel.

More specifically, FIG. 27 illustrates an example of a method of performing both (i) data transmission from a master device to a slave device and (ii) data reception of the master device from the slave device in one sub-interval. In FIG. 27, the data transmission and reception between the master device and the slave device may be performed based on a unicast scheme. Here, the master device and the slave device may be devices receiving a Bluetooth gaming service, and one player may be participating in the gaming service. Further, data transmitted by the master device to the slave device may include haptic feedback data and audio data, and data transmitted by the slave device to the master device may be data/control data generated based on a user input (for service operation) related to the Bluetooth gaming service. In this instance, the slave device may be a game controller device.

In FIG. 27, the entire duration of an ISO interval may be used as a sub-interval 2710. The sub-interval 2710 may include a first interval 2711 for data transmission of the master device to the slave device and a second interval 2713 for data transmission of the slave device to the master device. Only if the data based on the user input exists in the second interval 2713, data transmission may be performed in the second interval 2713. A length of the sub-interval 2710 may be variably defined based on the size of transmitted data. That is, if the size of data is small, the length of the sub-interval 2710 may be short, and in the opposite case, the length of the sub-interval 2710 may be long.

Figure 28:
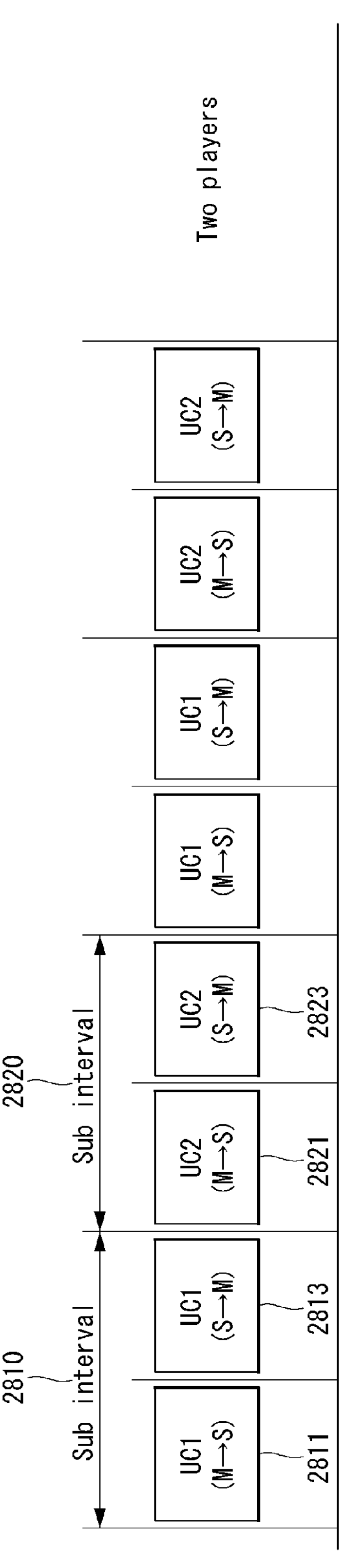
FIG. 28 illustrates another example of a time interval defined for data transmission and reception through a Bluetooth isochronous channel.

FIG. 28 illustrates another example of a time interval defined for data transmission and reception through a Bluetooth isochronous channel.

More specifically, FIG. 28 illustrates an example of a method of performing both (i) data transmission from a master device to a slave device and (ii) data reception of the master device from the slave device in one sub-interval. In FIG. 28, the data transmission and reception between the master device and the slave device may be performed based on a unicast scheme. Here, the master device and the slave device may be devices receiving a Bluetooth gaming service, and two players may be participating in the gaming service. Further, data transmitted by the master device to the slave device may include haptic feedback data and audio data, and data transmitted by the slave device to the master device may be data/control data generated based on a user input (for service operation) related to the Bluetooth gaming service. In this instance, the slave device may be a game controller device.

In FIG. 28, the entire duration of an ISO interval may be used as sub-intervals 2810 and 2820. Each of the sub-intervals 2810 and 2820 may include a first interval 2811/2821 for data transmission of the master device to the slave device and a second interval 2813/2823 for data transmission of the slave device to the master device. Only if the data based on the user input exists in the second interval 2813/2823, data transmission may be performed in the second interval 2813/2823. In the example of FIG. 28, the two players each use a controller (slave device) connected to one game machine (master device), and time allocated to each controller (slave device) is a half the time allocated to the slave device in the example of FIG. 27. The number of sub-intervals 2810 and 2820 included in one ISO interval may be the same as the number of players participating in the gaming service. Further, if one slave device is used per player, the number of sub-intervals 2810 and 2820 included in one ISO interval may be the same as the number of slave devices.

Figure 29:
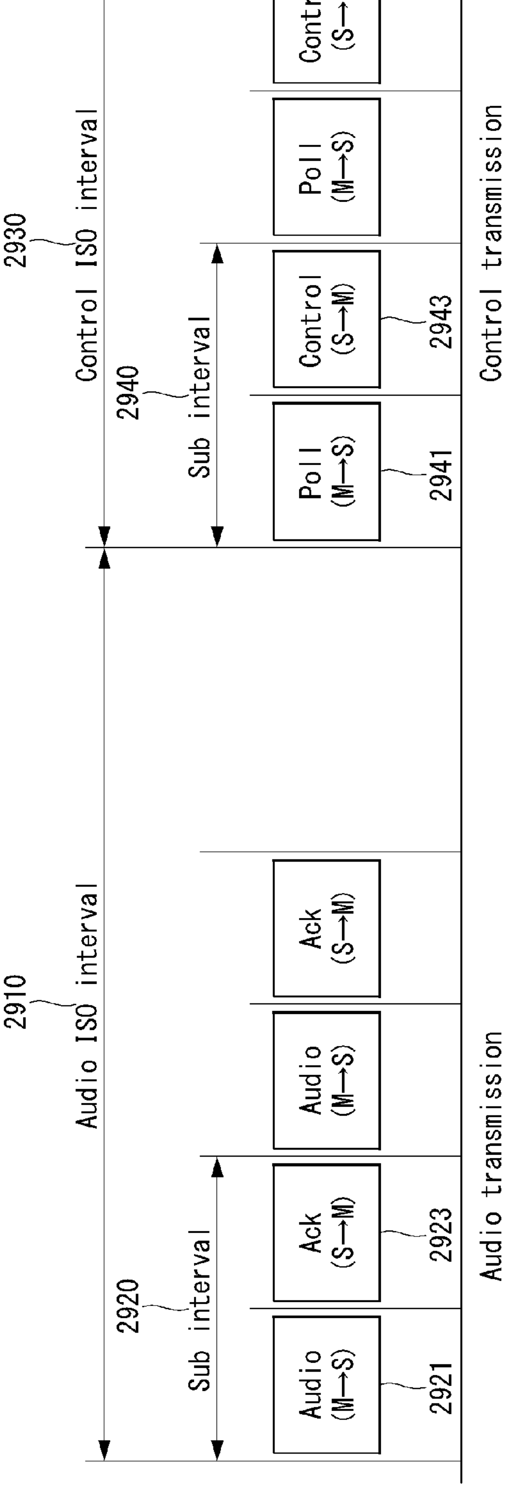
FIG. 29 illustrates another example of a time interval defined for data transmission and reception through a Bluetooth isochronous channel.

FIG. 29 illustrates another example of a time interval defined for data transmission and reception through a Bluetooth isochronous channel.

More specifically, FIG. 29 illustrates an example where an ISO interval 2910 for transmitting audio data and an ISO interval 2930 for transmitting data based on a user input are separately defined. In FIG. 29, audio data transmission from a master device to a slave device and data transmission from the slave device to the master device may be performed based on a unicast scheme. In this instance, a CIS channel for the audio data transmission and a CIS channel for the data transmission based on the user input are separately formed, and the audio data and the data based on the user input are independently transmitted based on a separate frequency hopping sequence. The ISO interval 2910 for transmitting the audio data is defined such that only a portion of the entire duration of the ISO interval 2910 is used as a sub-interval 2920, and a remaining time interval is flushed for data transmission. More specifically, in FIG. 29, the ISO interval 2910 includes two sub-intervals 2920, and the remaining time interval is flushed for data transmission. The portion of the ISO interval used as the sub-interval may include a first interval 2921 for data transmission of the master device to the slave device and a second interval 2922 for ACK transmission of the slave device to the master device. Further, the ISO interval 2930 for transmitting the data based on the user input includes a sub-interval 2940 included across the entire duration of the ISO interval 2930. The sub-interval 2940 may include a first interval 2941 for poll transmission of the master device to the slave device and a second interval 2943 for data transmission of the slave device to the master device.

Figure 30:
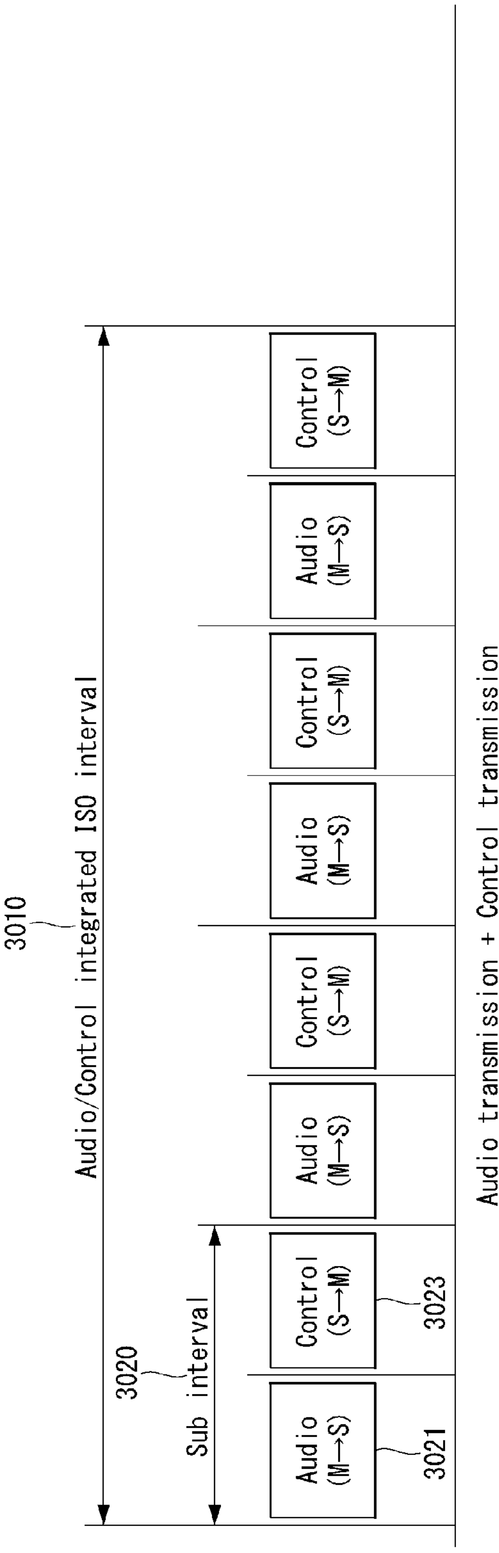
FIG. 30 illustrates another example of a time interval defined for data transmission and reception through a Bluetooth isochronous channel.

FIG. 30 illustrates another example of a time interval defined for data transmission and reception through a Bluetooth isochronous channel.

More specifically, FIG. 30 illustrates an example of performing both data transmission of a master device to a slave device and transmission of data based on a user input of the slave device to the master device in each of at least one sub-interval 3020 included in one ISO interval 3010. The ISO interval 3010 may be periodically allocated. In FIG. 30, the data transmission from the master device to the slave device and the data transmission from the slave device to the master device may be performed based on a unicast scheme. In this instance, the master device and the slave device may transmit and receive data through one CIS channel.

The entire duration of the ISO interval 3010 may be used as the sub-interval 3020. The sub-interval 3020 may include a first interval 3021 for data transmission of the master device to the slave device and a second interval 3023 for data transmission of the slave device to the master device. Only if the data based on the user input exists in the second interval 3023, data transmission may be performed in the second interval 3023. The data transmitted by the master device to the slave device in the first interval 3021 may be audio data related to a service provided to the master device and the slave device. The data generated based on the user input received by the master device from the slave device in the second interval 3023 may be chat input data generated based on user voice recognition. The data transmitted by the master device to the slave device in the first interval 3021 may be haptic feedback data related to the service provided to the master device and the slave device. The data generated based on the user input received by the master device from the slave device in the second interval 3023 may be control data for operating the service provided to the master device and the slave device. The audio data and the control data may be integrated into one sub-event. That is, the audio data and the control data may be integrated into one CIS channel. As the audio data and the control data are integrated into one CIS channel, sync between the audio data and the control data may be adjusted. Since transmission directions of the audio data and the control data are opposite to each other, the audio data and the control data may constitute one sub-event. Compared to when constituting a separate sub-event by each of the audio data and the control data, data transmission timing management can be efficiently achieved by constituting one sub-event by the audio data and the control data.

To perform both data transmission of the master device to the slave device and data transmission of the slave device to the master device in one ISO interval, a combination of the ISO intervals based on a combination of the unicast scheme and a broadcast scheme can be performed in addition to a combination of the sub-intervals based on the unicast scheme described above with reference to FIG. 30. More specifically, one ISO interval may include (i) a sub-interval based on the broadcast scheme for data transmission of the master device to the slave device and at least one sub-interval based on the unicast scheme for data transmission of the slave device to the master device. That is, the broadcast scheme and the unicast scheme are grouped to make a group. In this instance, a hybrid isochronous group (HIG) for synchronization between data transmitted from the master device to the slave device and data transmitted from the slave device to the master device may be defined. The HIG may include a broadcast sub-event and a unicast sub-event, and the broadcast sub-event and the unicast sub-event may share frequency hopping sequence timing with each other. The data transmitted from the master device to the slave device may be audio data related to a service provided to the master device and the slave device, and the data transmitted from the slave device to the master device may be data generated based on the user input. The data generated based on the user input may be data generated based on the user input for operating the service provided to the master device and the slave device.

By defining the ISO interval so that one ISO interval includes (i) a sub-interval based on the broadcast scheme for data transmission of the master device to the slave device and at least one sub-interval based on the unicast scheme for data transmission of the slave device to the master device, high-quality audio data transmission can be guaranteed, and periodic control data transmission can also be guaranteed.

Figure 31:
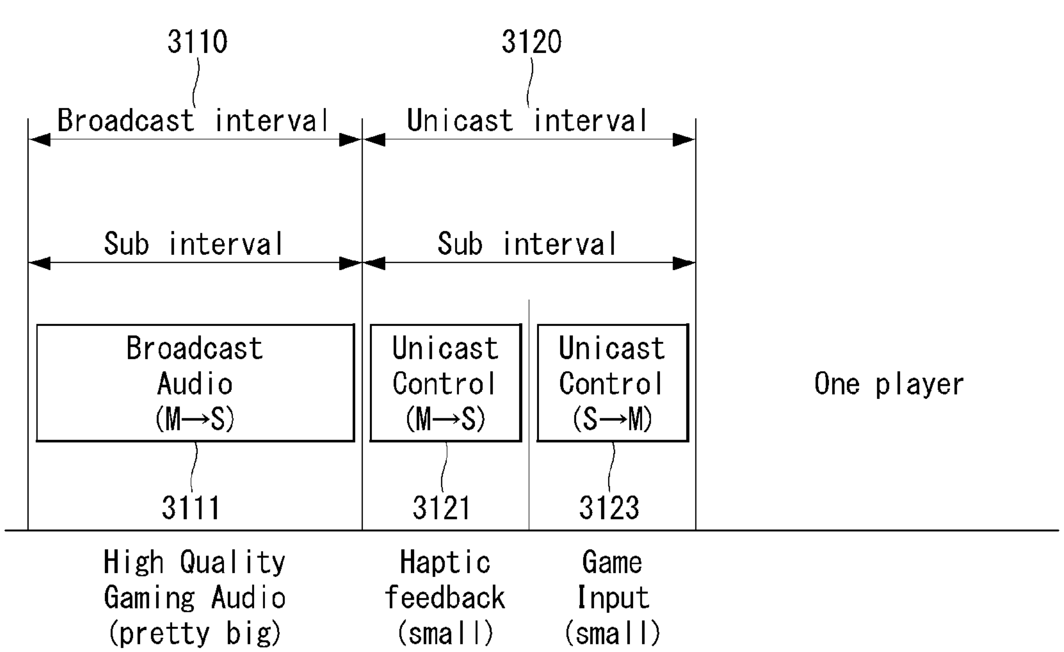
FIG. 31 illustrates another example of a time interval defined for data transmission and reception through a Bluetooth isochronous channel.

FIG. 31 illustrates another example of a time interval defined for data transmission and reception through a Bluetooth isochronous channel.

More specifically, FIG. 31 illustrates an example of a method of performing both (i) data transmission from a master device to a slave device and (ii) data reception of the master device from the slave device in one ISO interval. In FIG. 31, the data transmission and reception between the master device and the slave device may be performed based on both a broadcast scheme and a unicast scheme. Here, the master device and the slave device may be devices receiving a Bluetooth gaming service, and one player may be participating in the gaming service. In FIG. 31, the entire duration of the ISO interval may be used as sub-intervals 3110 and 3120. In particular, one sub-interval 3110 of the sub-intervals 3110 and 3120 included in the ISO interval is used for data transmission based on the broadcast scheme, and the other sub-interval 3120 is used for data transmission based on the unicast scheme. In FIG. 31, the sub-interval 3110, in which the data transmission based on the broadcast scheme is performed, among at least one sub-interval included in the ISO interval may not be divided into a first interval for data transmission of the master device to the slave device and a second interval for data transmission of the slave device to the master device. That is, the sub-interval 3110 may be used only for the data transmission of the master device to the slave device. In this instance, data transmitted by the master device to the slave device, i.e., data transmitted from the master device to the slave device may be audio data related to a service provided to the master device and the slave device. Further, the slave device receiving the audio data in the sub-interval 3110 may be a device such as a headset.

The sub-interval 3120 used for the data transmission based on the unicast scheme among the sub-intervals 3110 and 3120 included in the ISO interval may be divided into a first interval 3121 for data transmission of the master device to the slave device and a second interval 3123 for data transmission of the slave device to the master device. The data transmitted by the master device to the slave device in the first interval 3121 may be haptic feedback data related to the service provided to the master device and the slave device. The data generated based on a user input received by the master device from the slave device in the second interval 3123 may be control data for operating the service provided to the master device and the slave device. In addition, if there is no data transmitted in the first interval 3121, data transmitted in the second interval 3123 may be configured to be transmitted in the first interval 3121. By being configured in this way, there is an effect that a transmission delay of the control data can be reduced. The slave device that receives the haptic feedback data and transmits the control data in the sub-interval 3120 may be a device such as a game controller. To perform the method described in FIG. 31, the master device may form a BIS connection with a first slave device receiving audio data and form a CIS connection with a second slave device that receives haptic data and transmits control data. Although the ISO interval is defined in the example of FIG. 31 so that a broadcast sub-interval is located before a unicast sub-interval, the ISO interval may be defined so that the unicast sub-interval is located before the broadcast sub-interval. In FIG. 31, the number of remaining sub-intervals except for the sub-interval in which the audio data is transmitted may be the same as the number of slave devices that receives haptic feedback data and transmits control data. In this instance, each of the remaining sub-intervals except for the sub-interval in which the audio data is transmitted may be respectively related to any one of the slave devices that receives the haptic feedback data and transmits the control data.

The broadcast sub-interval and the unicast sub-interval may be grouped into one HIG and may share timing of the HIG. Channel Indexes of the broadcast sub-interval and the unicast sub-interval may be set differently from each other by Channel Index selection Algorithm #2.

Figure 32:
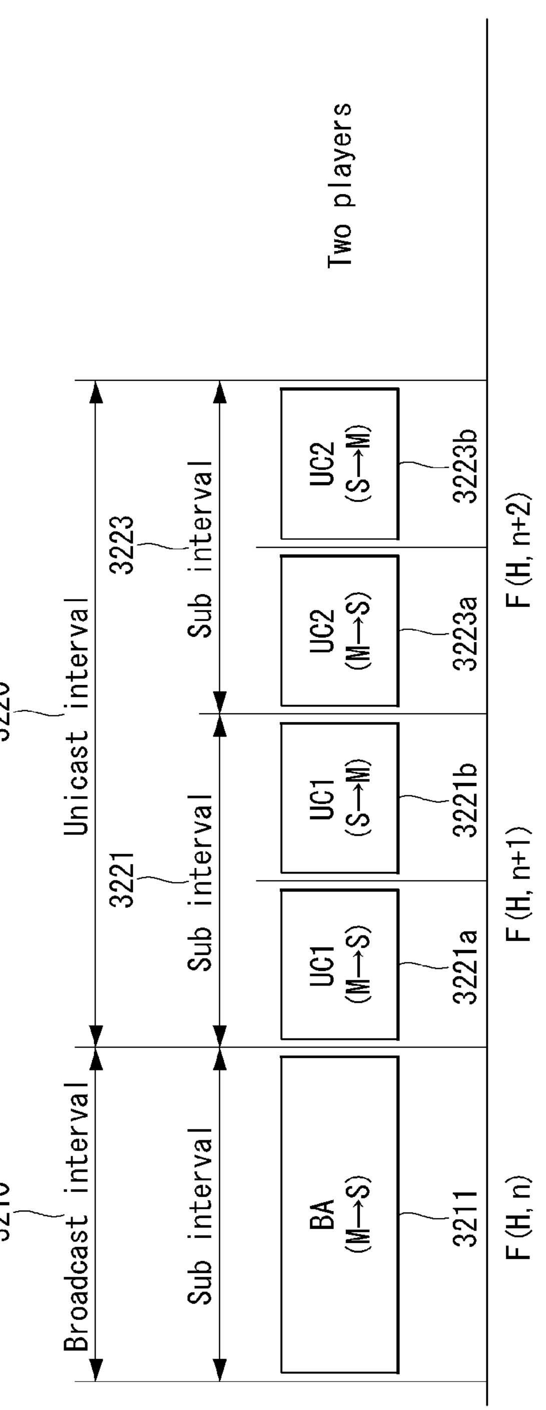
FIGS. 32 to 34 illustrate other examples of a time interval defined for data transmission and reception through a Bluetooth isochronous channel.
Figure 33:
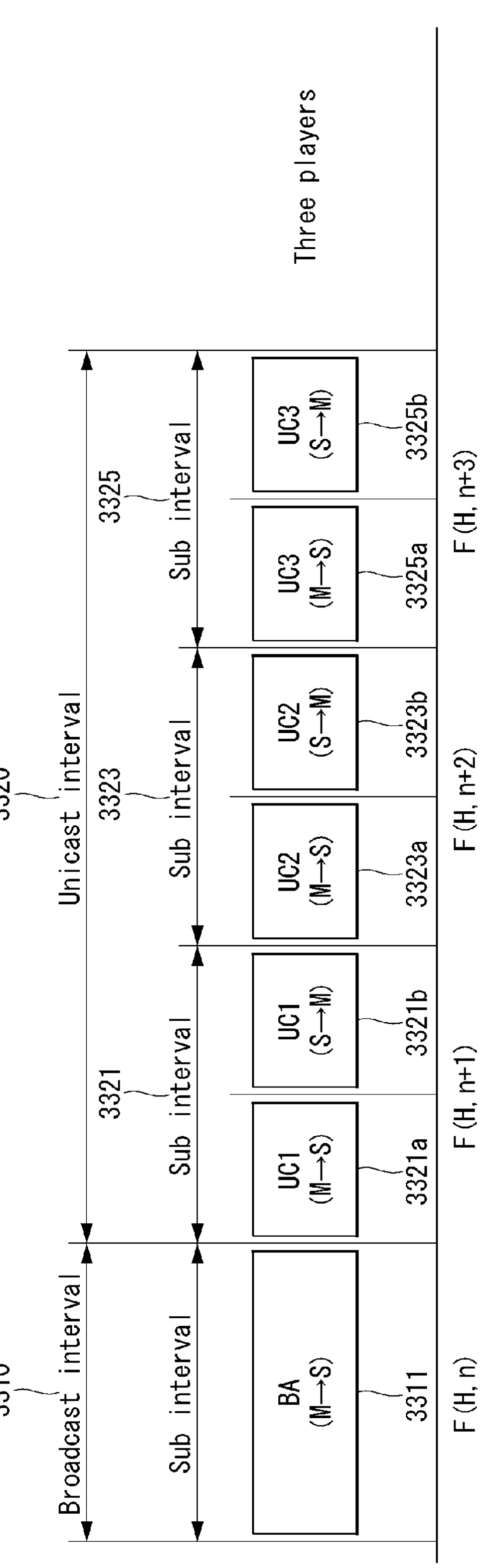
Figure 34:
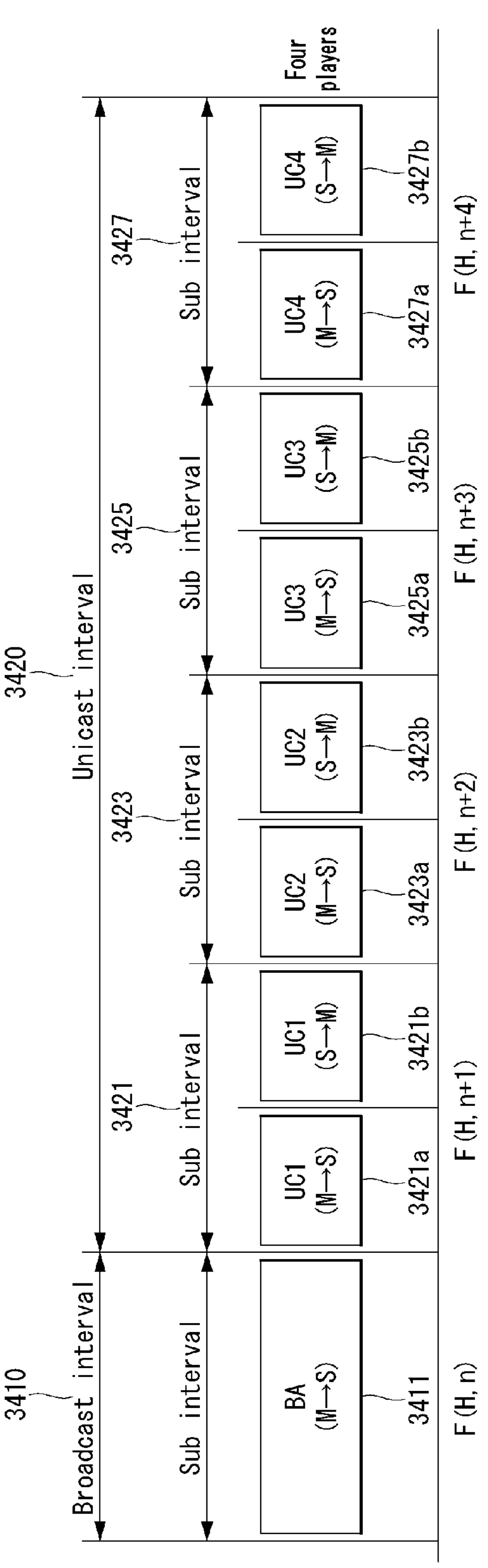

FIGS. 32 to 34 illustrate other examples of a time interval defined for data transmission and reception through a Bluetooth isochronous channel.

More specifically, FIGS. 32 to 34 illustrate examples where the method described in FIG. 31 is used, and the number of players participating in the gaming service is different from FIG. 31. FIG. 32 illustrates an example where two players participate in the gaming service, FIG. 33 illustrates an example where three players participate in the gaming service, and FIG. 34 illustrates an example where four players participate in the gaming service.

In FIGS. 32 to 34, in a broadcast interval 3210/3310/3410 included in one ISO interval, audio data may be transmitted in batches to all slave devices related to players participating in the gaming service.

In FIGS. 32 to 34, each of unicast intervals 3220, 3320 and 3420 may include sub-intervals of which the number is the same as the number of players participating in the gaming service. In this instance, since the ISO interval should be designed so that all the players have equal delay, the ISO interval may be interleaved in units of sub-interval. If a length of the sub-interval is set to 1 ms, a length of the unicast interval may be set to 2 ms, 3 ms and 4 ms in FIGS. 32 to 34, respectively. In FIGS. 32 to 34, a length of sub-interval constituting the broadcast interval may be different from a length of sub-interval constituting the unicast interval based on a size of the broadcasted audio data. That is, if the size of the broadcasted audio data is larger than a size of unicasted data, the length of the sub-interval constituting the broadcast interval may be longer than the length of one sub-interval constituting the unicast interval.

In summary, according to the methods illustrated in FIGS. 31 to 34, one ISO interval may include the broadcast interval and the unicast interval. In the broadcast interval, the audio data may be transmitted in batches to all the slave devices related to the players participating in the gaming service. Next, the unicast interval may include sub-intervals of which the number is the same as the number of players participating in the gaming service, and data exchange between the slave device of a specific player and the master device may be performed in each of the sub-intervals. FIGS. 31 to 34 illustrate that the ISO interval is defined such that the broadcast interval is located before the unicast interval, by way of example, but it is obvious that the ISO interval can be defined vice versa.

Unlike FIGS. 31 to 34, the ISO interval may be defined so that a length of the sub-interval constituting the broadcast interval is the same as a length of the sub-interval constituting the unicast interval. That is, if size of audio data is large, the audio data may be divided and transmitted so that a length of a sub-interval in which the audio data is transmitted is the same as a length of a sub-interval in which data of the unicast scheme is transmitted.

Figure 35:
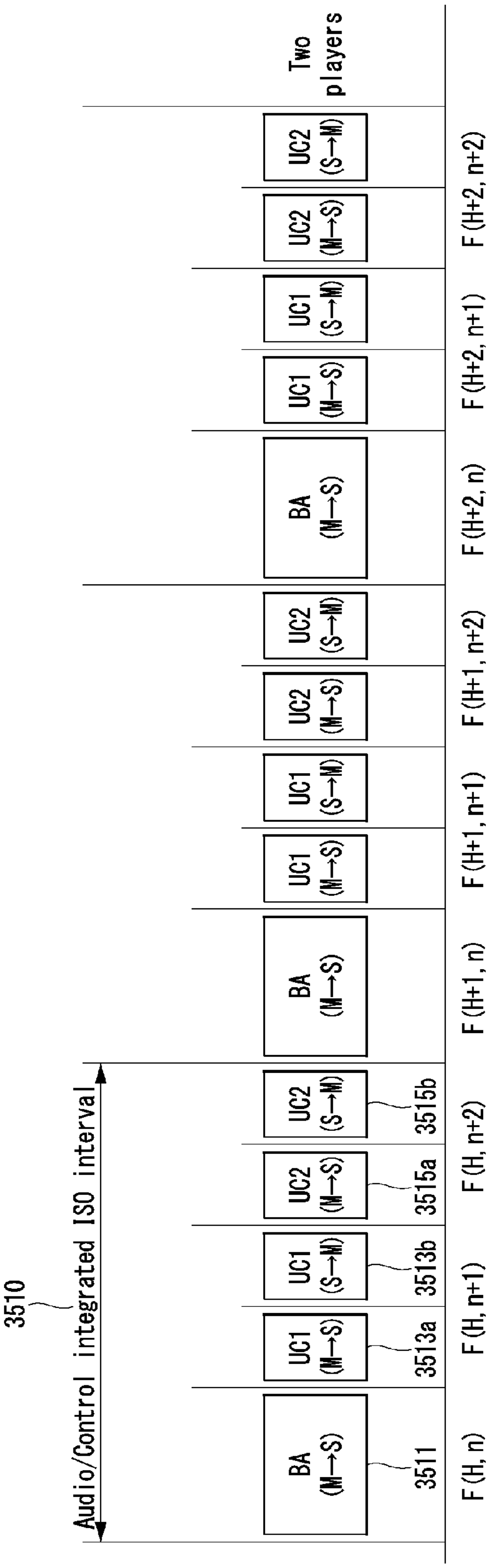

FIGS. 35 and 36 illustrate other examples of a time interval defined for data transmission and reception through a Bluetooth isochronous channel.

More specifically, FIGS. 35 and 36 illustrate examples of an ISO interval defined so that a length of sub-intervals constituting a broadcast interval is the same as a length of sub-intervals constituting a unicast interval. FIG. 35 illustrates an example where two players participate in the gaming service, and FIG. 36 illustrates an example where three players participate in the gaming service. Referring to FIGS. 35 and 36, one ISO interval 3510/3610 including a broadcast interval 3511/3611 including sub-intervals of the equal length and unicast intervals 3513*a*, 3513*b*, 3515*a* and 3515*b*/3613*a*, 3613*b*, 3615*a*, 3615*b*, 3617*a* and 3617*b* is defined.

FIG. 37 illustrates an effect of data transmission and reception based on a method described in the present disclosure.

In FIG. 37, reference numeral 3710 denotes timing at which the player participating in the gaming service inputs a user input to a slave device.

Reference numeral 3720 denotes data transmission and reception timing when the method described in the present disclosure is not applied. According to the reference numeral 3720, since only one type of data (audio data or control data) can be transmitted in one timeslot (time interval), it can be seen that (1) the generation of control data based on the user input is missed, (2) jitter delay of transmission of the generated control data increases, and (3) there is case where the control data collides with the audio data, making transmission impossible.

Reference numeral 3730 denotes data transmission and reception timing when the method described in the present disclosure is applied. According to the reference numeral 3730, since all types of data (audio data or control data) can be transmitted in one timeslot (time interval), it can be seen that (1) the generation of control data based on the user input is not missed, (2) jitter delay in transmission of the control data is reduced, and (3) the audio data and the control data can be integrated and transmitted.

FIG. 38 is a flowchart illustrating an example where a method of transmitting and receiving data in a short-range wireless communication system described in the present disclosure is performed by a master device.

More specifically, the master device forms a Connected Isochronous channel Stream (CIS) channel or a Broadcast Isochronous channel Stream (BIS) channel with at least one first slave device, in S3810.

Next, the master device forms a CIS channel with at least one second slave device, in S3820.

Subsequently, the master device transmits and receives data to and from the at least one first slave device and the at least one second slave device based on at least one time interval that is periodically allocated, in S3830.

In this instance, each of the at least one time interval includes at least one sub-time interval, and the at least one sub-time interval includes (i) a first time interval in which the master device transmits data to the at least one first slave device and/or the at least one second slave device and (ii) a second time interval in which the master device receives data generated based on a user input from the at least one first slave device and/or the at least one second slave device.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the above detailed description should not be construed as limiting in all aspects and should be considered as illustrative. The scope of the present disclosure should be determined by rational construing of the appended claims, and all modifications within an equivalent scope of the present disclosure are included in the scope of the present disclosure. Further, the present disclosure describes both the product invention and the method invention, and the description of both inventions can be supplementarily applied as needed.

INDUSTRIAL APPLICABILITY

The preferred embodiments of the present disclosure described above are disclosed for an exemplary purpose, and modifications, changes, substitutions, or additions of various other embodiments can be made by those skilled in the art within the technical spirit and the technical scope of the present disclosure described in the appended claims below.

The invention claimed is:

1. A method of transmitting and receiving, by a master device, data in a short-range wireless communication system, the method comprising:

forming a Connected Isochronous channel Stream (CIS) channel or a Broadcast Isochronous channel Stream (BIS) channel with at least one first slave device;

forming the CIS channel with at least one second slave device; and transmitting and receiving data to and from the at least one first slave device and the at least one second slave device based on at least one time interval that is periodically allocated, wherein each of the at least one time interval includes at least one sub-time interval, wherein the at least one sub-time interval includes (i) a first time interval in which the master device transmits data to the at least one first slave device or the at least one second slave device and (ii) a second time interval in which the master device receives data generated based on a user input from the at least one first slave device or the at least one second slave device, wherein the data transmitted by the master device to the at least one second slave device in the first time interval is haptic feedback data related to a service provided to the master device and the at least one second slave device, and wherein the data generated based on the user input received by the master device from the at least one second slave device in the second time interval is control data for operating the service provided to the master device and the at least one second slave device.

2. The method of claim 1, wherein a channel formed by the master device and the at least one first slave device is the BIS channel.

3. The method of claim 2, wherein the data transmitted by the master device to the at least one first slave device is audio data related to a service provided to the master device and the at least one first slave device.

4. The method of claim 3, wherein a sub-time interval, in which the audio data is transmitted, among the at least one sub-time interval included in one time interval is not divided into the first time interval and the second time interval.

5. The method of claim 4, wherein the audio data is transmitted in an entire duration of the sub-time interval in which the audio data is transmitted.

6. The method of claim 4, wherein remaining sub-time intervals except for the sub-time interval, in which the audio data is transmitted, among the at least one time interval included in the one time interval are divided into the first time interval and the second time interval.

7. The method of claim 6, wherein a number of the remaining sub-time intervals except for the sub-time interval in which the audio data is transmitted is the same as a number of the at least one second slave device, and wherein each of the remaining sub-time intervals except for the sub-time interval in which the audio data is transmitted is respectively related to any one of the at least one second slave device.

8. The method of claim 1, wherein, based on there being no data transmitted in the first time interval, the data transmitted in the second time interval is transmitted in the second time interval.

9. The method of claim 1, wherein a channel formed by the master device and the at least one first slave device is the CIS channel.

10. The method of claim 9, wherein the data transmitted by the master device to the at least one first slave device in the first time interval is audio data related to a service provided to the master device and the at least one first slave device.

11. The method of claim 10, wherein the data generated based on the user input received by the master device from the at least one first slave device in the second time interval is chat input data generated based on user voice recognition.

12. The method of claim 11, wherein the data transmitted by the master device to the at least one second slave device in the first time interval is haptic feedback data related to a service provided to the master device and the at least one second slave device.

13. The method of claim 12, wherein the data generated based on the user input received by the master device from the at least one second slave device in the second time interval is control data for operating the service provided to the master device and the at least one second slave device.

14. The method of claim 9, wherein a number of the at least one sub-time interval is the same as each of a number of the at least one first slave device and a number of the at least one second slave device.

15. A master device transmitting audio data in a short-range wireless communication system, the master device comprising:

a transmitter configured to transmit a radio signal;

a receiver configured to receive the radio signal;

at least one processor; and at least one computer memory operably connectable to the at least one processor, wherein the at least one computer memory is configured to store instructions that allow the at least one processor to perform operations based on being executed by the at least one processor, wherein the operations comprise:

forming a Connected Isochronous channel Stream (CIS) channel or a Broadcast Isochronous channel Stream (BIS) channel with at least one first slave device;

forming the CIS channel with at least one second slave device; and transmitting and receiving data to and from the at least one first slave device and the at least one second slave device based on at least one time interval that is periodically allocated, wherein each of the at least one time interval includes at least one sub-time interval, wherein the at least one sub-time interval includes (i) a first time interval in which the master device transmits data to the at least one first slave device or the at least one second slave device and (ii) a second time interval in which the master device receives data generated based on a user input from the at least one first slave device or the at least one second slave device, wherein the data transmitted by the master device to the at least one second slave device in the first time interval is haptic feedback data related to a service provided to the master device and the at least one second slave device, and wherein the data generated based on the user input received by the master device from the at least one second slave device in the second time interval is control data for operating the service provided to the master device and the at least one second slave device.

* * * * *